(12) United States Patent
Ito et al.

(10) Patent No.: US 11,531,185 B2
(45) Date of Patent: Dec. 20, 2022

(54) OPTICAL INFORMATION READER AND METHOD OF MANUFACTURING THE OPTICAL INFORMATION READER

(71) Applicant: DENSO WAVE INCORPORATED, Aichi-pref. (JP)

(72) Inventors: Makoto Ito, Chita-gun (JP); Ryo Sugiura, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 282 days.

(21) Appl. No.: 16/634,840

(22) PCT Filed: Jul. 25, 2018

(86) PCT No.: PCT/JP2018/027939
§ 371 (c)(1),
(2) Date: Jan. 28, 2020

(87) PCT Pub. No.: WO2019/022153
PCT Pub. Date: Jan. 31, 2019

(65) Prior Publication Data
US 2020/0393645 A1 Dec. 17, 2020

(30) Foreign Application Priority Data

Jul. 28, 2017 (JP) .............................. JP2017-146512
Aug. 28, 2017 (JP) .............................. JP2017-163043
Feb. 6, 2018 (JP) .............................. JP2018-019580

(51) Int. Cl.
*G02B 9/04* (2006.01)
*G06K 7/10* (2006.01)
*G02B 7/02* (2021.01)

(52) U.S. Cl.
CPC ............ *G02B 9/04* (2013.01); *G06K 7/10544* (2013.01); *G02B 7/02* (2013.01); *G06K 7/10* (2013.01); *G06K 7/10821* (2013.01)

(58) Field of Classification Search
CPC .. G06K 7/10544; G06K 7/10722; G06K 7/14; G06K 7/1478; G06K 7/10881
(Continued)

(56) References Cited

U.S. PATENT DOCUMENTS 7,527,207 B2 * 5/2009 Acosta ............... G06K 7/10881
235/462.31
2008/0302873 A1 * 12/2008 Kotlarsky .......... G06K 7/10732
235/462.15
(Continued)

FOREIGN PATENT DOCUMENTS

JP    2008-282458 A    11/2008
JP    2010-039958 A    2/2010
(Continued)

OTHER PUBLICATIONS

Sep. 18, 2018 International Search Report issued in International Patent Application No. PCT/JP2018/027939.

*Primary Examiner* — Edwyn Labaze
(74) *Attorney, Agent, or Firm* — Oliff PLC

(57) ABSTRACT

An optical information reader includes an imaging lens and a lens retainer retaining the imaging lens and assembled, in this state, into the holder. The lens retainer includes a flange bottom surface and end faces as a reference surface that is parallel to an optical axis of the imaging lens. The holder includes a top surface and edge faces as a guide surface. The guide surface is brought into surface contact with the flange bottom surface and the end faces when the lens retainer is assembled into the holder, and is brought into slidable contact with the flange bottom surface and the end faces when the lens retainer is moved along the optical axis. Thus, (Continued)

influence of one-sided blur is minimized in terms of variation in resolution which is measured when obtaining an optimal focus position by changing relative positions of the area sensor and the imaging lens.

18 Claims, 30 Drawing Sheets

(58) Field of Classification Search
USPC ............ 235/462.41, 462.45, 462.43, 462.24, 235/462.11, 375
See application file for complete search history.

(56) References Cited

U.S. PATENT DOCUMENTS

| | | |
|---|---|---|
| 2009/0039161 A1 | 2/2009 | Matsushima |
| 2012/0006895 A1 | 1/2012 | Vinogradov et al. |

FOREIGN PATENT DOCUMENTS

| | | | |
|---|---|---|---|
| JP | 2010-097315 A | 4/2010 | |
| JP | 3166849 U | 3/2011 | |
| JP | 2011-123791 A | 6/2011 | |
| JP | 2014-026371 A | 2/2014 | |
| WO | WO-02073953 A2 * | 9/2002 | ............ G06K 13/08 |

* cited by examiner

FIG.13
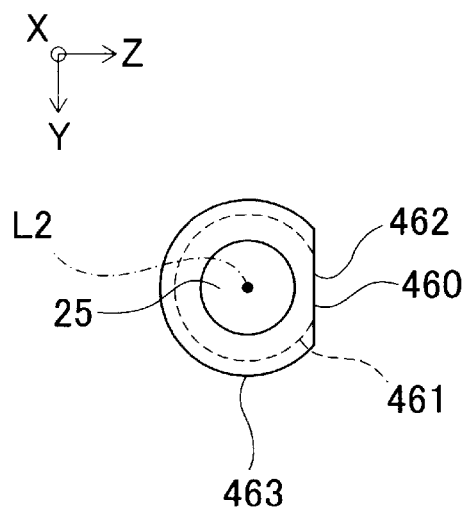
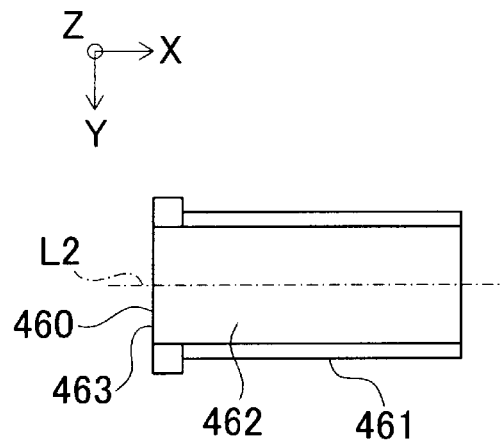
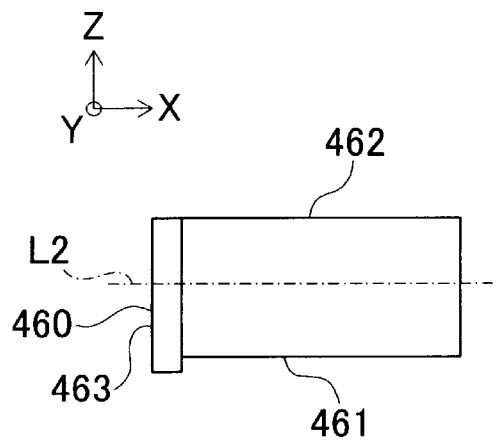

FIG.26
(A)
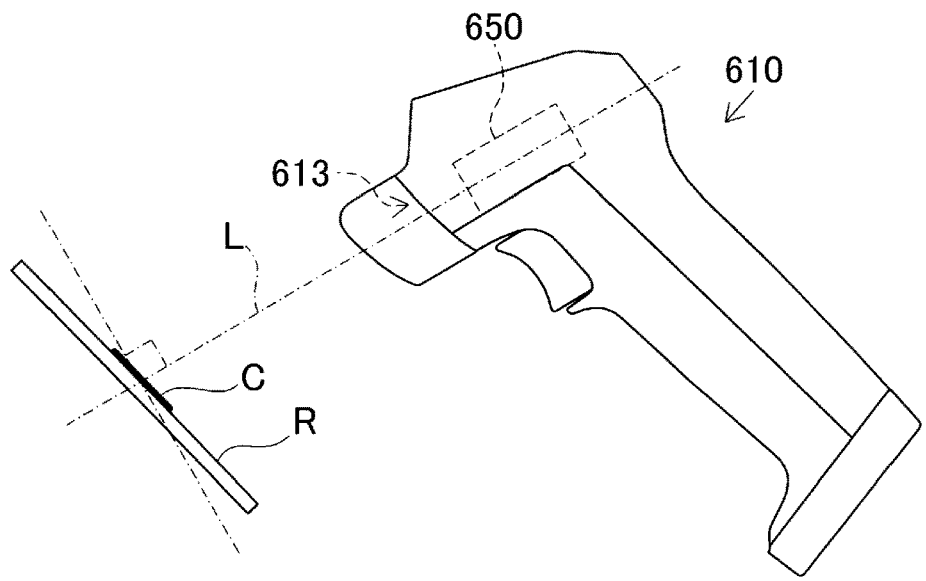
(B)
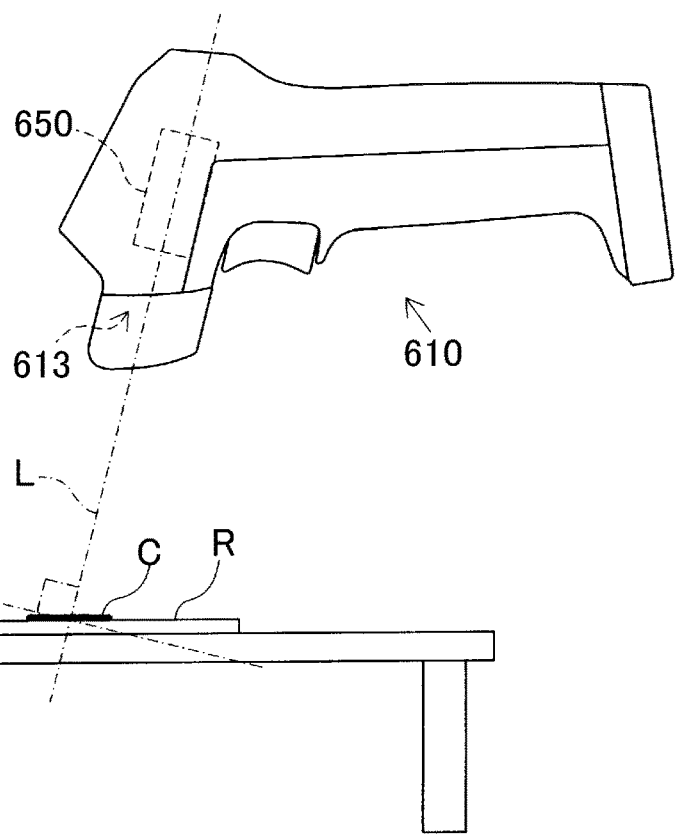

FIG.27
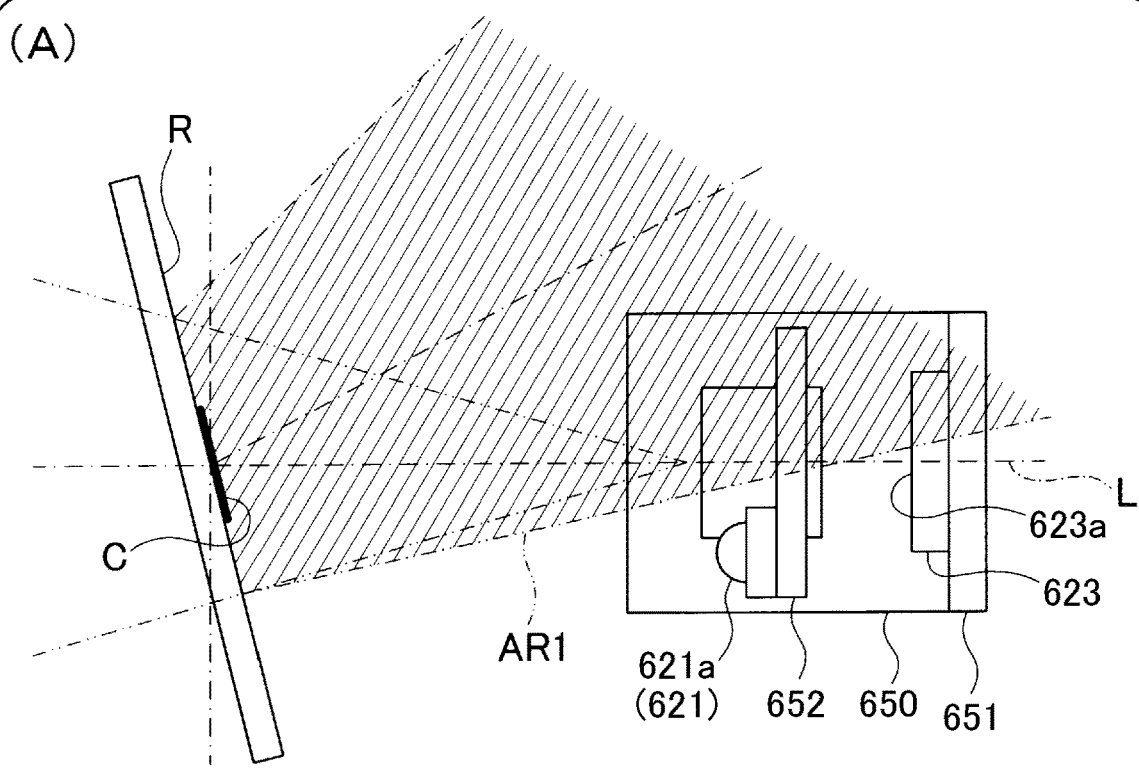
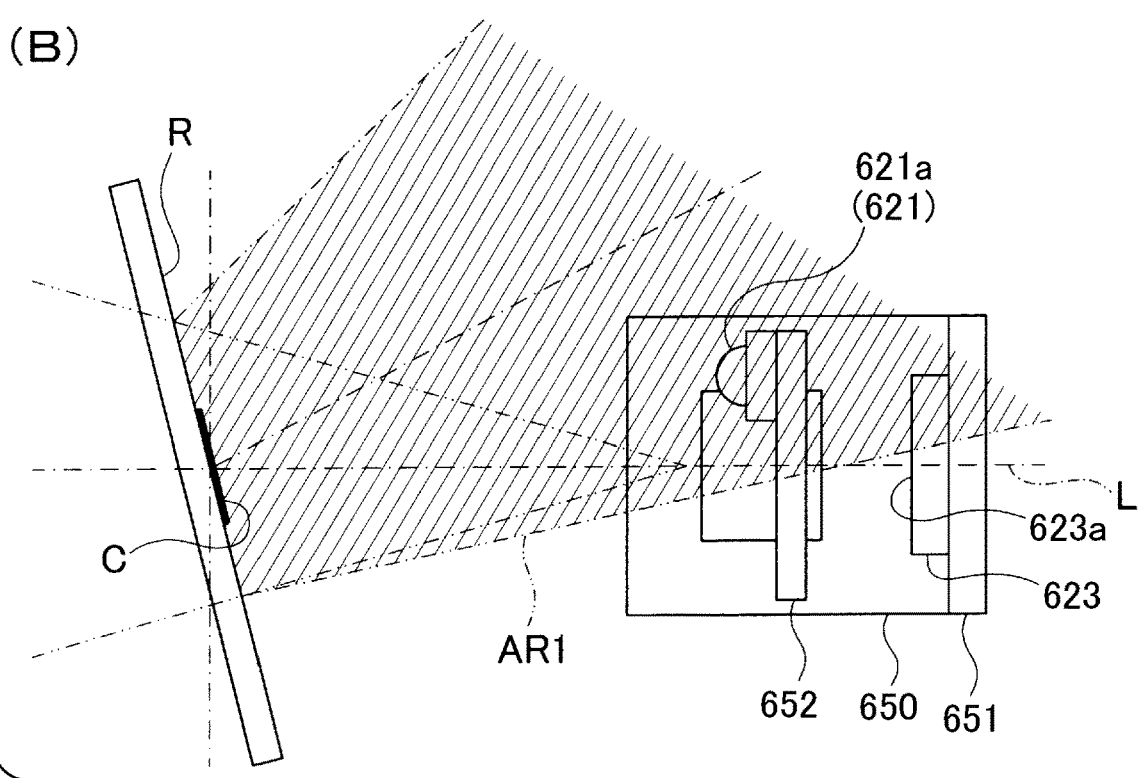

FIG.28
(A)
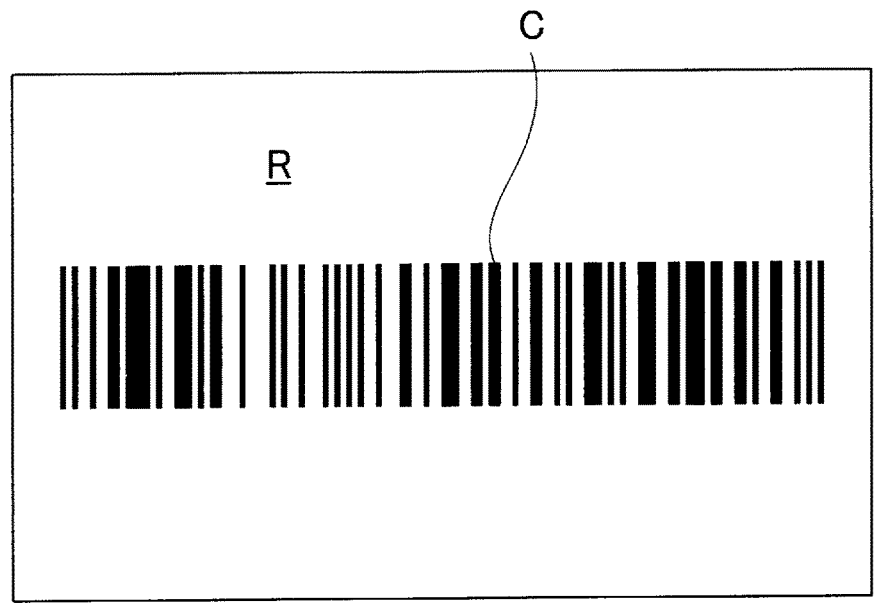
(B)
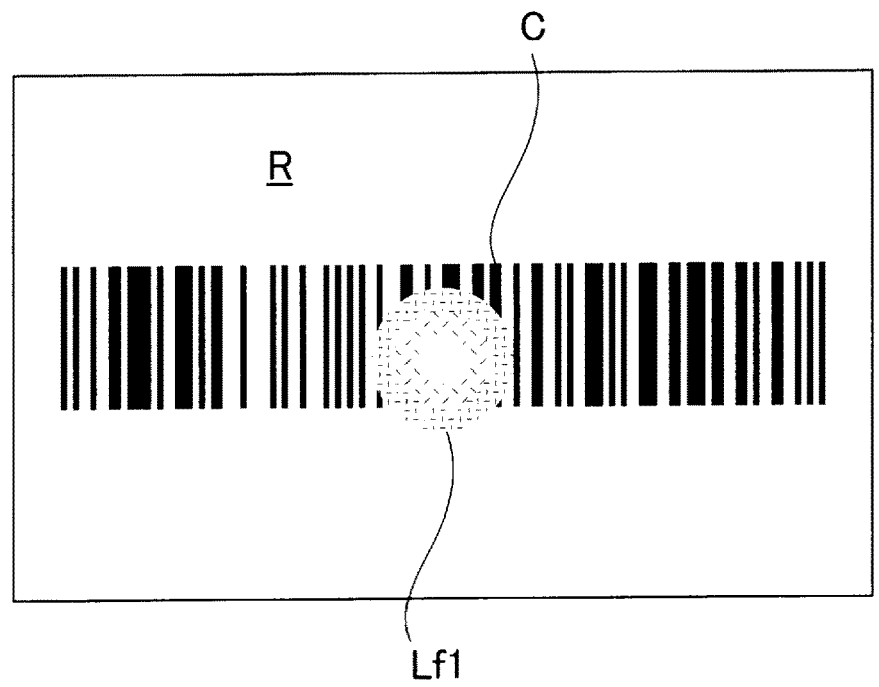

OPTICAL INFORMATION READER AND METHOD OF MANUFACTURING THE OPTICAL INFORMATION READER

CROSS-REFERENCE TO RELATED APPLICATION

This application is based on and claims the benefit of priority from earlier Japanese Patent Applications No. 2017-146512 filed on Jul. 28, 2017; No. 2017-163043 filed on Aug. 28, 2017; and No. 2018-019580 filed on Feb. 6, 2018 the descriptions of which are incorporated herein by reference.

BACKGROUND

Technical Field

The present invention relates to an optical information reader and a method of manufacturing the optical information reader.

Background Art

Recently, retail shops, convenience stores and the like are in need of contactless reading systems, e.g., optical reading systems, more than ever due to widespread use of two-dimensional codes, such as QR codes (trademark). Such reading systems are used for reading two-dimensional codes affixed to coupons or the like.

Use of reading devices including an area sensor in which imaging elements are two-dimensionally arrayed may enable reading of not only barcodes but also two-dimensional codes. Introduction of such reading devices is expected to increase in future. Since barcodes are still required to be read, reading devices capable of reading two-dimensional codes are also required to read barcodes. Furthermore, there is also a growing need for recognizing and reading passport information from a captured image of a passport by using a known symbol recognition processing function (OCR).

For this purpose, optical information readers that include an area sensor have been provided with a lens barrel to capture an image of an information code or the like at a stable distance and to read the captured image thereof. The lens barrel serves as a member for adjusting and maintaining relative positions of the area sensor and an imaging lens for determining a predetermined focus position (best focus). The imaging lens in this case is used for producing an image of reflected light from the information code or the like on the area sensor. The lens barrel has an outer peripheral surface in which threads are formed, and an interior into which the imaging lens is assembled. The lens barrel, with an imaging lens being assembled thereto, is threadably engaged, via the threads, with a holder into which the area sensor has been assembled.

The relative positions of the area sensor and the imaging lens have been adjusted by adjusting the amount of this threadable engagement of the lens barrel. As an example of an optical information reader that adjusts the relative positions of an area sensor and an imaging lens by adjusting the amount of such a threadable engagement, there is known an optical information reader disclosed in PTL 1.

Recently, in addition to the increasing needs mentioned above, public accommodation facilities, lockers, railroads or medical facilities tend to introduce information codes more than ever for security measures. For example, information codes are used in these facilities for encryption, authenticity verification, or the like. In these usages, some reading devices use invisible light, such as infrared light, in addition to visible light, which has been used as illumination light, to improve security. These reading devices often use visible light as usual illumination light, but switch light to invisible light, such as infrared light, to avoid dazzling in public places or the like where such light tends to be visible for many people.

For example, as a technique related to optical information readers using two types of light, there is known a reading device disclosed in PTL 2. This reading device uses upconversion which occurs due to simultaneous application of near infrared light and infrared light from two different illuminants. Thus, when receiving reflected light from a transparent two-dimensional barcode, this upconversion enables reading of a signal having high power and high S/N ratio to thereby improve information identification performance.

CITATION LIST

Patent Literature

[PTL 1] JP 2014-026371 A
[PTL 2] JP 2010-039958 A

Low-cost imaging lenses used for optical information readers tend to suffer from manufacturing variation. Due to this variation, performance relating to imaging may be lowered in part of the periphery of the visual field (this may simply be termed one-sided blur hereinafter). Imaging lenses causing no one-sided blur change resolution according to the relative positions of the area sensor and the imaging lens and, when the relative positions have agreed with an optimal focus position, exhibit resolution which is most highly rated.

However, when imaging lenses causing one-sided blur are used in a structure in which the relative positions of the area sensor and the imaging lens are adjusted according the amount of threadable engagement, the optimal focus position is determined based on the resolution which is measured every time the amount of threadable engagement is changed. In this case, the portion causing one-sided blur may be involved in rotation about the optical axis. When the one-sided blur portion is rotatably moved, resolution may vary according to the position of the one-sided blur portion. Therefore, if the relative positions of the area sensor and the imaging lens agree with the optimal focus position, resolution as measured may be underrated. Such a situation may raise a first issue of optimal adjustment of the focus position being disabled.

In reading devices which include both an illuminant emitting visible light and an illuminant emitting invisible light, such as infrared light, there is usually a difference in application range between visible light and invisible light relative to the imaging field of view (imaging field) due to positional constraints of the light-receiving sensor relative to the respective illuminants.

Therefore, when a state of being irradiated with visible light is switched to a state of being irradiated with invisible light, the irradiation range of invisible light cannot be visually confirmed. Accordingly, when reading is performed targeting the irradiation range of visible light as a readable range, invisible light is not necessarily suitably applied to the information code, raising a second issue that reading in a state of being irradiated with invisible light is unsuccessful.

This second issue may also be similarly raised in the case reading an information code, with visible light and invisible light being simultaneously irradiated thereto. In particular, when reading an information code located at a short distance, larger misalignment may occur between the irradiation range of visible light and that of invisible light, making the above issue prominent.

SUMMARY

Thus it is desired to solve the first issue described above and aim to provide a configuration that can minimize the influence of one-sided blur in terms of variation in resolution which is measured when determining an optimal focus position by changing the relative positions of the area sensor and the imaging lens.

It is also desired to solve the second issue described above and aim to provide a configuration that can minimize reading performance deterioration due to misalignment between irradiation ranges when there are provided an illuminant emitting visible light and an illuminant emitting invisible light.

To achieve the first issue, a first mode of the present disclosure provides an optical information reader including an area sensor that receives reflected light from an information code via an imaging lens, and optically reading the information code, based on a signal outputted from the area sensor, including:

a holder to which the area sensor is fixed; and a lens retainer that retains the imaging lens and is assembled, in this state, into the holder, the lens retainer including a reference surface that is parallel to an optical axis of the imaging lens, wherein the holder is provided with a guide surface with which the reference surface is brought into surface contact and against which the reference surface is brought into slidable contact, the surface contact being achieved when the lens retainer is assembled into the holder so that light passing through the imaging lens produces an image on the area sensor, the slidable contact being achieved when the lens retainer is moved along the optical axis.

According to the first mode, the lens retainer retaining the imaging lens is assembled into the holder in which the area sensor is fixed. The lens retainer includes a reference surface parallel to the optical axis of the imaging lens. The holder includes a guide surface with which the reference surface is brought into surface contact and slidable contact. The surface contact is achieved when the lens retainer is assembled into the holder so that light entering through the imaging lens produces an image in the area sensor. The slidable contact is achieved when the lens retainer is moved along the optical axis.

Thus, when relative positions of the area sensor and the imaging lens are adjusted, the lens retainer is moved relative to the holder along the optical axis so that the reference surface is brought into slidable contact with the guide surface. Specifically, when the relative positions of the area sensor and the imaging lens suffering from one-sided blur are changed to find an optimal focus position, the one-sided blur portion does not rotate and move. Accordingly, the influence of one-sided blur is minimized in terms of variation in resolution to be measured.

According to an example of the first mode, the area sensor has a rectangular light-receiving surface, and a position where one-sided blur occurs is confirmed for each imaging lens. Furthermore, the lens retainer retains the imaging lens so that the portion of the field of view causing the one-sided blur is locate outside the light-receiving surface near a long side thereof. Thus, unlike the case where the imaging lens is retained so that the portion of the field of view causing one-sided blur is located near a short side of the light-receiving surface, the portion of the field of view causing one-sided blur can be easily brought to a position outside the imaging field of view of the area sensor. Consequently, the influence of one-sided blur can be minimized and resolution can be improved.

According to another example, the reference surface includes a planar first reference surface and planar second reference surfaces with which the first reference surface intersects, and the guide surface includes a planar first guide surface with which the first reference surface is brought into slidable contact, and planar second guide surfaces with which the second reference surfaces are respectively brought into slidable contact. Thus, the reference surface and the guide surface are each constituted by two planar surfaces to easily achieve a configuration of moving the lens retainer relative to the holder along the optical axis.

According to still another example, the lens retainer includes a flange which has a flat surface on an imaging lens side, the flat surface including at least a portion serving as the first reference surface, and the holder is formed so that a portion of the lens retainer is housed in the holder via an opening provided to a flat surface of the holder, the portion of the lens being located closer to the imaging lens than to the flange when assembled, the flat surface having at least a portion serving as the first guide surface.

It is preferred that the flange is formed so as to have a flat surface on an imaging lens side, the flat surface covering the opening during the slidable contact. Thus, since the flange serves as a light shielding member for preventing entry of light via the opening, light shielding effect of the holder can be improved.

According to a second mode, there is provided a method of manufacturing an optical information reader for manufacturing the optical information reader set forth above. The method includes steps of:

assembling the lens retainer retaining the imaging lens into the holder, to which the area sensor is fixed, so that the reference surface is brought into surface contact with the guide surface;

assembling an arm movable along the optical axis to the lens retainer;

sequentially measuring resolution of the area sensor, while the arm is moved in a direction along the optical axis so that the reference surfaces is brought into slidable contact with the guide surface;

fixing the lens retainer, with the arm being assembled thereto, to the holder at a peak position where measured resolution is regarded to be a peak; and detaching the arm from the lens retainer.

In the second mode, the lens retainer retaining the imaging lens is assembled into the holder, to which the area sensor is fixed, so that the reference surface is brought into surface contact with the guide surface. Then, the arm movable along the optical axis is assembled to the lens retainer, and then the area sensor sequentially measures resolution while the arm is moved in a direction along the optical axis so that the reference surface is brought into slidable contact with the guide surface. Then, the lens retainer in a state of being assembled to the arm is fixed to the holder at a peak position where the measured resolution is regarded to be a peak. Then, the arm is detached from the lens retainer.

Thus, when the lens retainer is fixed to the holder at a peak position, the lens retainer is unlikely to be displaced from the peak position because the arm has been assembled to the lens retainer. Accordingly, adjustment is reliably made at an optimal focus position obtained by measuring resolution.

In the second mode, in the step of fixing the lens retainer to the holder, for example, the peak position is obtained while the arm is moved in a first direction along the optical axis, the arm is then moved over the peak position in a second direction along the optical axis, and the arm is then moved in the first direction toward the peak position to fix the lens retainer to the holder at the peak position.

When changing the movement direction of the arm from the first direction to the second direction, there may be the case where the lens retainer does not move in spite of the an actuator for moving the arm being driven, due to the allowance or the like of the actuator. In this case, if adjustment is made by moving the lens retainer in a direction toward the peak position which has been found during movement in the first direction, the lens retainer may be fixed at a position displaced from the peak position.

Therefore, if the peak position has been obtained during movement in the first direction, the arm is moved over the peak position in the second direction parallel to the optical axis. Then, the arm is moved in the first direction toward the peak position to fix the lens retainer to the holder at the peak position. This may prevent the occurrence of displacement, mentioned above, from the peak position, and adjustment can be more reliably made at an optimal focus position.

For example, in the step of sequentially measuring resolution, a movement amount of the arm when resolution of a predetermined value or more is measured is set so as to be smaller than a movement amount of the arm when resolution of less than the predetermined value is measured. Thus, measurement time up to the vicinity of the peak position can be reduced, and measurement accuracy is enhanced in measurement in the vicinity of the peak position. Thus, reduction of measurement time and enhancement of measurement accuracy can both be satisfied.

To achieve the second issue, a third mode of the present disclosure provides an optical information reader including an area sensor that receives reflected light from an information code at a rectangular light-receiving surface, and optically reading the information code, based on a signal outputted from the area sensor, including:

a first illuminant emitting visible light and a second illuminant emitting invisible light toward an imaging field of view of the area sensor, the visible light and the invisible light serving as illumination light, wherein the first illuminant and the second illuminant are arranged in line along a short-side direction of the light-receiving surface.

In the third mode, the optical information reader includes the area sensor that receives reflected light from the information code at the rectangular light-receiving surface, and the first and second illuminants that respectively emit visible light and invisible light as illumination light toward the imaging field of view of the area sensor. The first and second illuminants are arranged in line along a short-side direction of the light-receiving surface.

Thus, the irradiation ranges of the visible light and the invisible light are unlikely to be misaligned from each other in a long-side direction of the imaging field of view, relative to a rectangular imaging field of view conforming to the shape of the light-receiving surface. Usually, when reading an information code that is long in a single direction, such as a barcode, the information code is oriented to the reading window such that the long-side direction of the information code will align the long-side direction of the reading window.

In this situation, the irradiation ranges of the visible light and the invisible light are not misaligned in the long-side direction relative to the information code. Accordingly, unsuccessful reading or the like can be minimized, which would have occurred due to misalignment of the irradiation ranges in the long-side direction, e.g., which would have occurred due to the invisible light being applied to one end portion of the information code and not applied to the other end portion thereof in the long-side direction. Thus, if the optical information reader includes both the first and second illuminants respectively emitting visible light and invisible light, reading performance deterioration due to misalignment of the irradiation ranges can be minimized.

According to an example of the third mode, the first illuminant and the second illuminant are arranged so that a light-receiving axis of the area sensor is located between the first illuminant and the second illuminant. Thus, the center of the imaging field of view and the centers of the irradiation ranges of the visible light and the invisible light approach for alignment in the short-side direction of the imaging field of view. Therefore, misalignment between the imaging field of view and the irradiation ranges can be reduced even more to thereby improve reading performance.

According to another example, the first illuminant and the second illuminant are arranged being distanced from the imaging lens in a long-side direction of the light-receiving surface. Thus, there occurs no interference with the imaging lens, if the first and second illuminants and are arranged close to each other in the short-side direction of the light-receiving surface. Accordingly, close arrangement of first and second illuminants and can downsize the optical information reader.

According to still another example, the first illuminant and the second illuminant are mounted on the same substrate. This can not only minimize misalignment between the first and second illuminants, but also facilitate compact arrangement of the first and second illuminants. Consequently, the optical information reader can be downsized.

According to still another example, an illumination lens used for the first illuminant and an illumination lens used for the second illuminant are integrally formed. This can not only reduce the number of parts in terms of illumination lens, but also facilitate compact arrangement of the first and second illuminants. Consequently, the optical information reader can be downsized.

According to still another example, the first illuminant and the second illuminant are arranged so that an irradiation range of the first illuminant is positioned at a level lower than that of an irradiation range of the second illuminant as viewed from a user.

Usually, when reading an information code presented on a given target surface, the user may perform reading while observing the information code via the reading window. Therefore, the upper part of the given target surface tends to be relatively tilted while facing away from the reading window. In this situation, a return field of view produced via the given target surface is at a level higher than that of the light-receiving axis. Accordingly, if the first illuminant emitting visible light having light intensity higher than that of invisible light is located at a level higher than that of the light-receiving axis, the first illuminant may tend to enter the return field of view.

In other words, an image of visible light reflected on the given target surface is likely to be captured. Therefore, the captured image of the information code may include an image of the visible light, deteriorating reading performance.

It should be noted that the bracketed reference signs indicate correspondence with specific means in the description of embodiments set forth below.

BRIEF DESCRIPTION OF THE DRAWINGS

To cope with this, the first and second illuminants and may be arranged such that the irradiation range of the first illuminant is located at a level lower than that of the second illuminant, as viewed from the user. Thus, the first illuminant is unlikely to enter the return field of view produced via the given target surface. This may minimize reading performance deterioration which is due to capturing of an image of the visible light having high light intensity.

In the accompanying drawings:

FIG. 13 is a set of diagrams each illustrating a configuration of a holder according to a fifth embodiment, in which a part (A) of FIG. 13 is a front view, a part (B) of FIG. 13 is a plan view and a part (C) of FIG. 13 is a side view.

FIG. 26 is a set of diagrams each illustrating an angle between an information code on a target surface and an optical information reader during reading processing, in which a part (A) of FIG. 26 illustrates the case of reading an information code on a given target surface such as of a hand-held label, and a part (B) of FIG. 26 illustrates the case of reading an information code C on a given target surface such as of a label place on a desk.

FIG. 27 is a set of diagrams each illustrating a relationship between a return field of view produced via a given target surface and a light-receiving axis, in which a part (A) of FIG. 27 illustrates a state in which a first illuminant is located at a level lower than that of the light-receiving axis, and a part (B) of FIG. 27 illustrates a state in which the first illuminant is located at a level higher than that of the light-receiving axis.

FIG. 28 is a set of diagrams in which a part (A) of FIG. 28 illustrates an image of an information code captured in a state of the part (A) of FIG. 27, and a part (B) of FIG. 28 illustrates an image of an information code captured in a state of the part (B) of FIG. 27.

DESCRIPTION OF THE EMBODIMENTS

Figure 1:
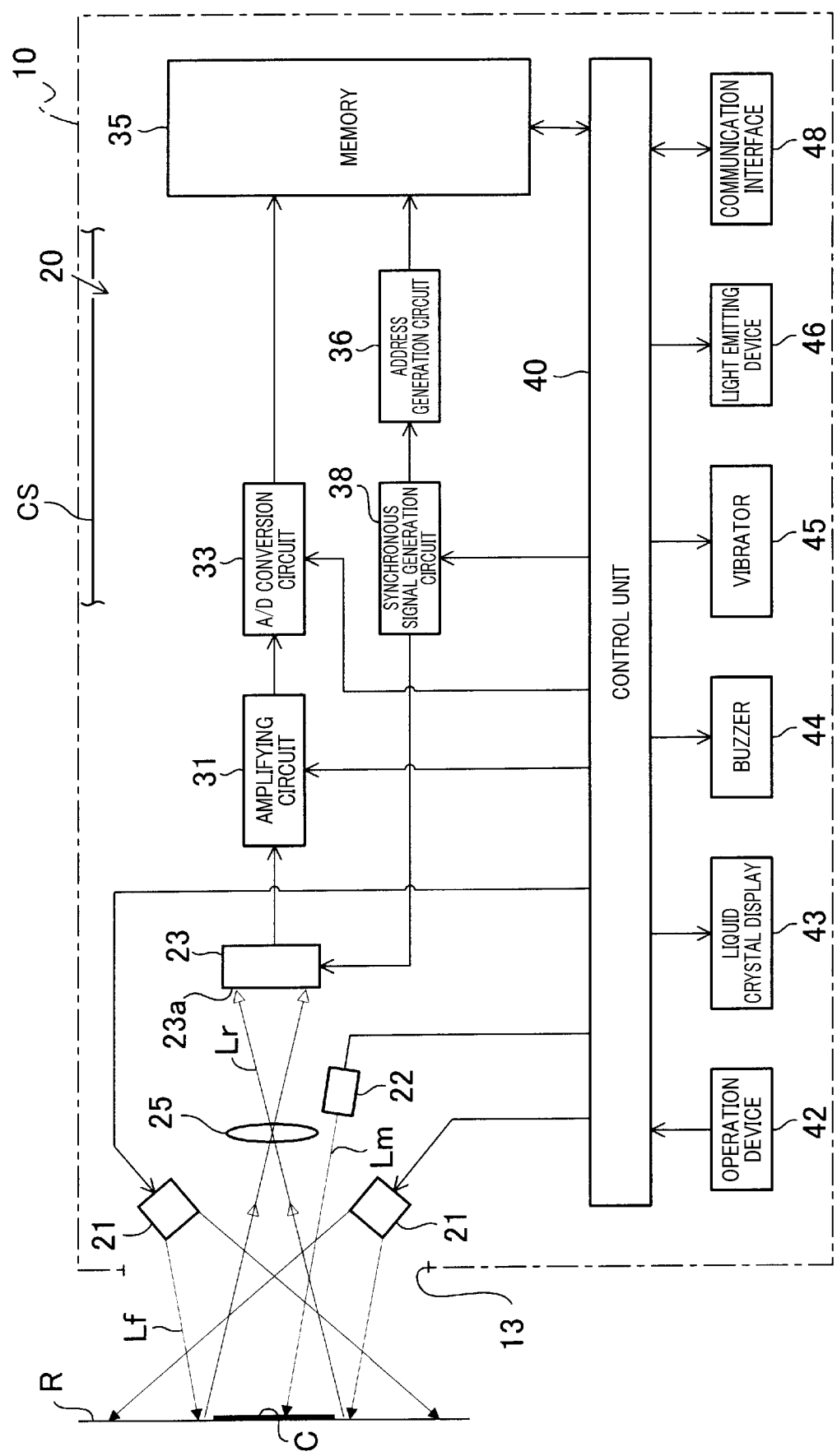
FIG. 1 is a schematic block diagram illustrating a configuration of an optical information reader according to a first embodiment.

Referring to the accompanying drawings, the following description explains embodiments of various modes embodying an optical information reader having a configuration for solving the issues set forth above, and a method of manufacturing the optical information reader.

First Embodiment

Referring to the drawings, an optical information reader according to a first embodiment of the present invention will be described.

An optical information reader 10 according to the present embodiment is constituted as an information code reader which optically reads an information code C, such as one- or two-dimensional code. Examples of the one-dimensional code may be barcodes, such as a JAN code, EAN, UPC, ITF code, CODE 39, CODE 128 and NW-7. Examples of the two-dimensional code may be square information codes, such as a QR code, data matrix code, Maxi code, or Aztec code.

The optical information reader 10 includes a casing CS and a circuit part 20 housed in the casing CS. The circuit part 20 mainly includes an optical system including an illuminant 21, a marker light emitter 22 and an area sensor 23, and a microcomputer system including a memory 35 and a control unit 40.

The optical system includes a projection optical system and a light-receiving optical system. The projection optical system includes the illuminant 21 and the marker light emitter 22. The illuminant 21 serves as an illuminant capable of emitting illumination light Lf, and includes, for example, a LED and a lens that is provided to an emission side of the LED.

The marker light emitter 22 serves as a marker light source capable of emitting marker light Lm for indicating a center of an imaging range of the area sensor 23, and includes, for example, a LED and a lens that is provided to an emission side of the LED. FIG. 1 conceptually shows an example in which the illumination light Lf and the marker light Lm are emitted toward a reading target R to which an information code C is affixed.

The light-receiving system includes the area sensor 23 and an imaging lens 25. The area sensor 23 is constituted as a light-receiving sensor which is capable of capturing an image of the information code C. The light-receiving sensor in this case includes a rectangular light-receiving surface 23a where solid-state imaging elements, such as C-MOSs or CCDs, are two-dimensionally arrayed. The area sensor 23 is ensured to output an electrical signal according to the intensity of reflected light Lr, for each cell (pattern) of the received information code. The area sensor 23 is mounted to a sensor substrate 20a so as to be able to receive light incident thereon via the imaging lens 25.

The imaging lens 25 is constituted including one or more lenses, and serves as an imaging optical system which collects light that has entered the optical system from outside via a reading window 13 to produce an image on the light-receiving surface 23a of the area sensor 23. In the present embodiment, the illumination light Lf emitted from the illuminant 21 is ensured to be reflected on the information code C or the reading target R to which the information code C is affixed. Furthermore, the reflected light Lr is ensured to be collected by the imaging lens 25 and a code image is ensured to be produced on the light-receiving surface 23a of the area sensor 23.

Figure 2:
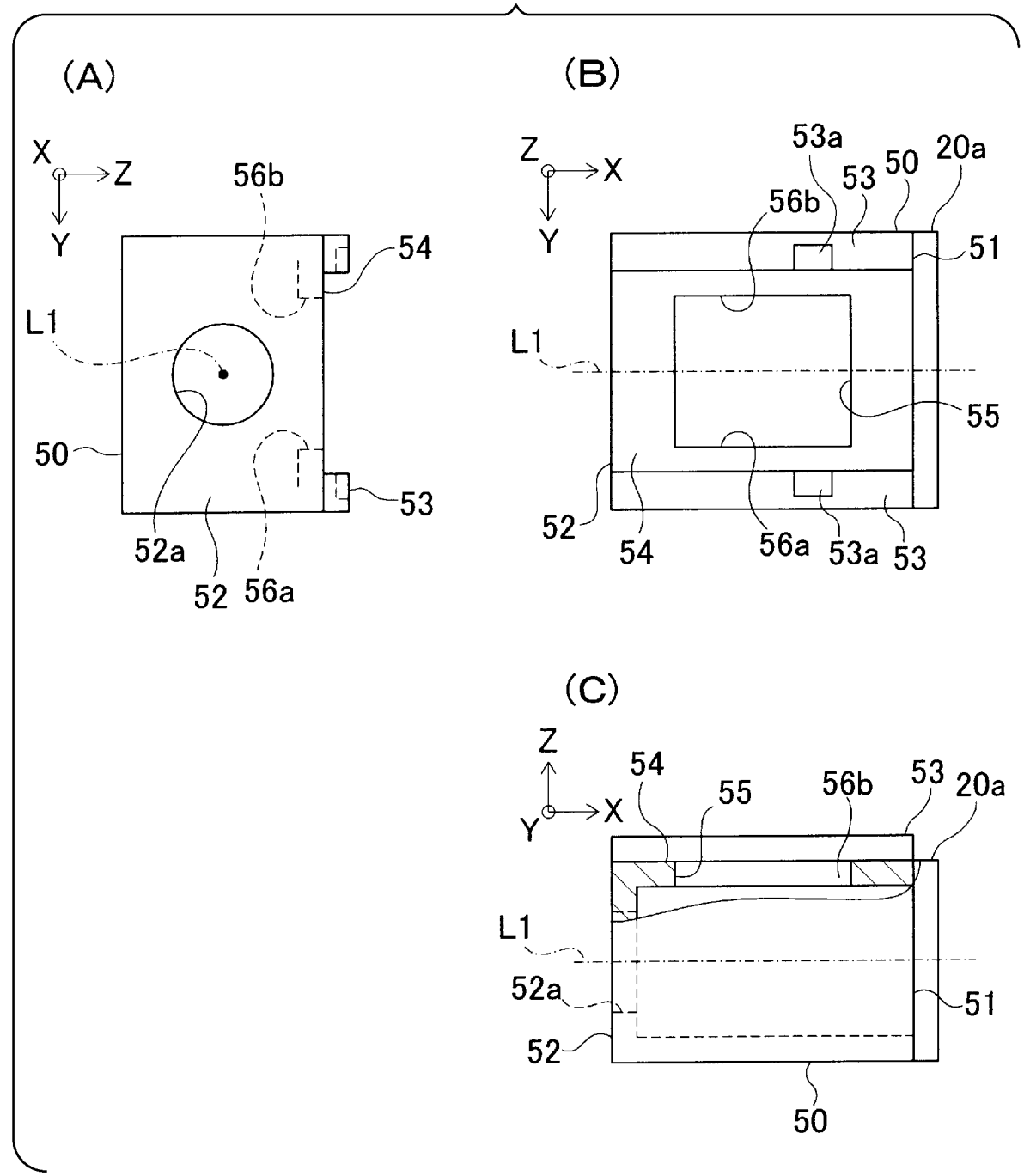
FIG. 2 is a set of diagrams each illustrating a configuration of a holder according to the first embodiment, in which a part (A) of FIG. 2 is a front view, a part (B) of FIG. 2 is a plan view and a part (C) of FIG. 2 is a side view.
Figure 3:
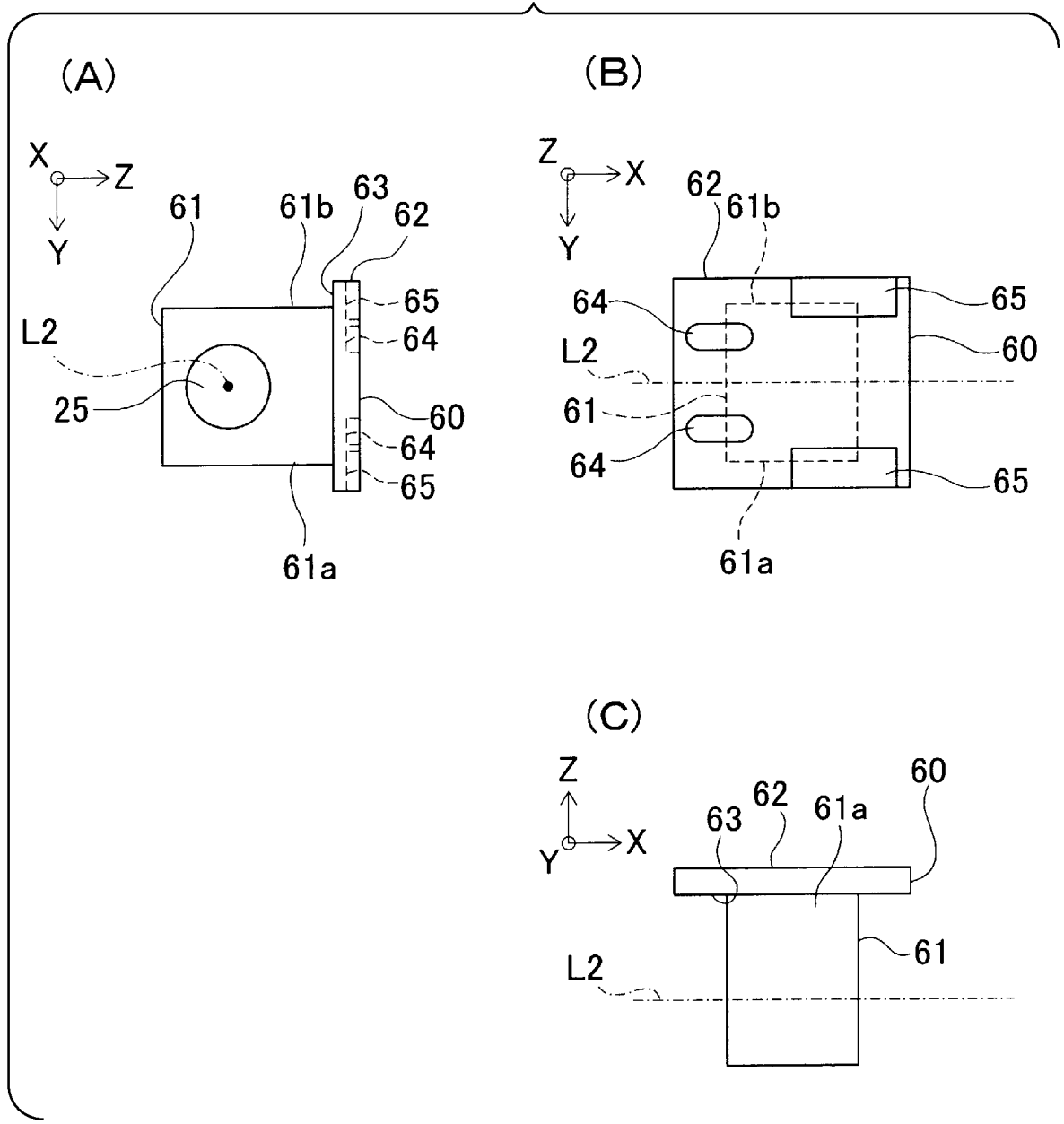
FIG. 3 is a set of diagrams each illustrating a configuration of a lens retainer according to the first embodiment, in which a part (A) of FIG. 3 is a front view, a part (B) of FIG. 3 is a plan view and a part (C) of FIG. 3 is a side view.
Figure 4:
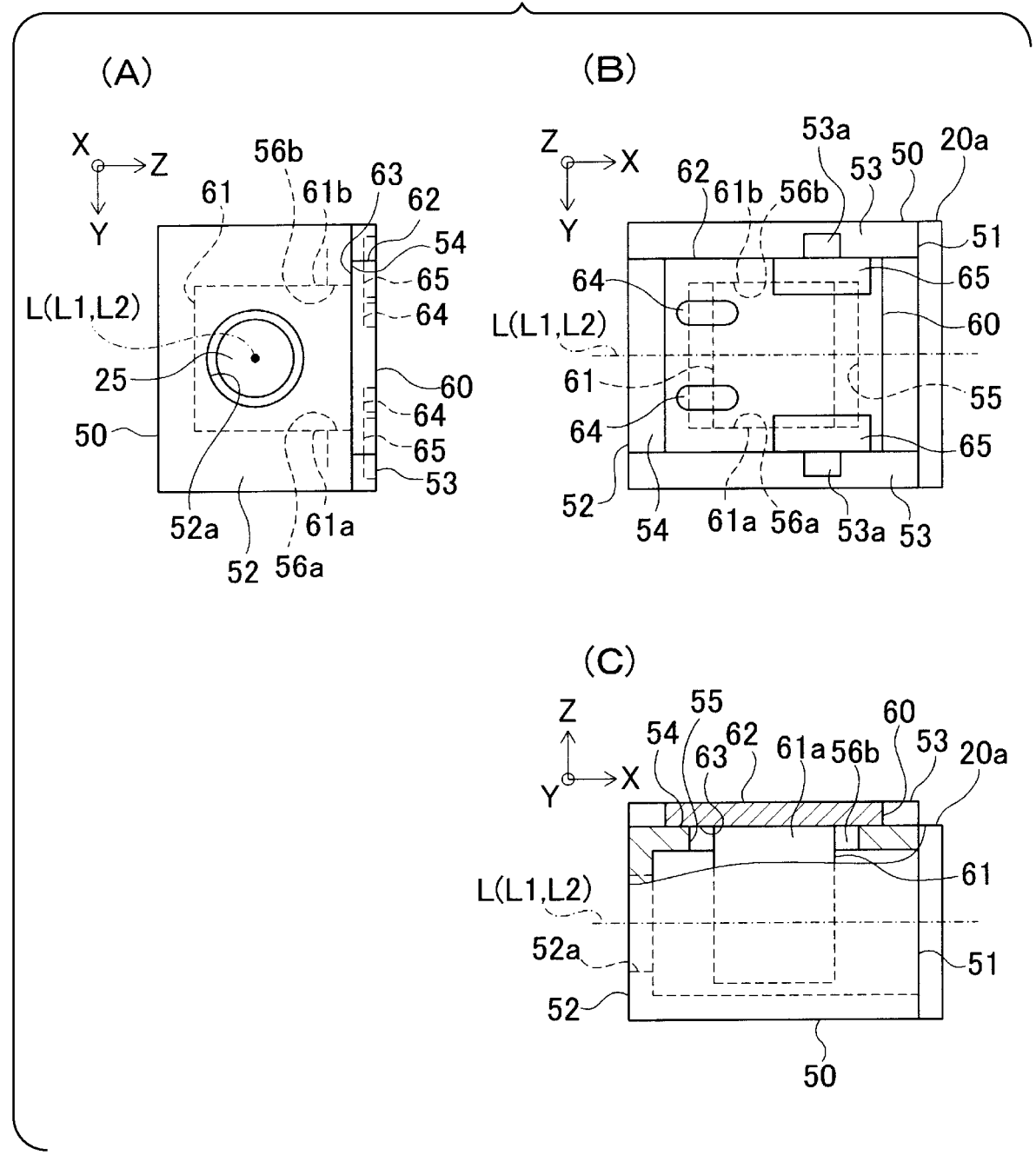
FIG. 4 is a set of diagrams each illustrating a state in which the lens retainer has been assembled to the holder according to the first embodiment, in which a part (A) of FIG. 4 is a front view, a part (B) of FIG. 4 is a plan view and a part (C) of FIG. 4 is a side view.

As shown in FIGS. 2 to 4, the light-receiving optical system includes a holder 50 to which the sensor substrate 20a is fixed, and a lens retainer 60 retaining the imaging lens 25. The following description will be provided by defining an X direction, a Y direction and a Z direction as follows. The X direction is defined to be a direction which is parallel to an optical axis L of the area sensor 23 and the imaging lens 25. The Y direction is defined to be a direction which is parallel to a plane where a top surface 54 of the holder 50 is brought into surface contact with a flange bottom surface 63 of the lens retainer 60, described later, and which is perpendicular to the X direction. The Z direction is defined to be a direction which is perpendicular to both the X and Y directions.

As shown in parts (A) to (C) of FIG. 2, the holder 50 substantially has a box shape, with one end 51 thereof being open so as to be able to fix the sensor substrate 20a thereto. The sensor substrate 20a is fixed to the holder 50 so as to cover this opening. Thus, the area sensor 23 mounted to the sensor substrate 20a is housed in the holder 50. The holder 50 has another end 52 which faces the light-receiving surface 23a of the area sensor 23, and is provided with a circular opening 52a centering on an optical axis L1 of the area sensor 23. To enhance light shielding effect of the holder 50, the opening 52a is formed so as to expose only the imaging lens 25 retained by the lens retainer 60 and the vicinity thereof as viewed in the direction of the optical axis L1.

As shown in the parts (A) to (C) of FIG. 2, the holder 50 has a top where a planar top surface 54 is formed parallel to the optical axis L1 of the area sensor 23 so as to be positioned between a pair of edge portions 53 extending in the X direction. The top surface 54 has a center where a rectangular opening 55 is formed. The opening 55 has edge faces 56a and 56b which are parallel to the optical axis L1 of the area sensor 23, face each other in the Y direction, and are perpendicular to the top surface 54. The length of the opening 55 in the Y direction is determined so that movement of the lens retainer 60 in a direction different from the direction along the optical axis L1 is constrained by the edge faces 56a and 56b being brought into slidable contact with the lens retainer 60 at the time of slide adjustment which will be described later.

Also, the opening 55 has a length in the X direction which is determined according to the allowable sliding length of the lens retainer 60 at the time of slide adjustment. In the pair of edge portions 53, adhesive grooves 53a are respectively formed for use in adhesion and fixation after slide adjustment. It should be noted that the top surface 54 may correspond to an example of the "guide surface" and the "first guide surfaces", and the edge faces 56a and 56b may correspond to an example of the "guide surface" and the "second guide surfaces".

As shown in parts (A) to (C) of FIG. 3, the lens retainer 60 includes a retainer body 61 that retains the imaging lens 25, and a flange 62 that is connected to top of the retainer body 61. As will be described later, the imaging lens 25 is retained by the retainer body 61 considering the position occurring one-sided blur. The retainer body 61 has end faces 61a and 61b in the Y direction which are perpendicular to the bottom surface 63. The end faces 61a and 61b in the vicinity of the flange 62 are ensured to be parallel to an optical axis L2 of the imaging lens 25 and slidably in contact with the respective edge faces 56a and 56b of the opening 55. It should be noted that the end faces 61a and 61b may correspond to an example of the "reference surface" and the "second reference surfaces".

The flange 62 substantially has a plate shape and has a length in the Y direction which is determined so that the flange 62 is slidably in contact with the edge portions 53 during slide adjustment. The flange 62 is formed such that the flange bottom surface 63, i.e., an imaging lens 25 side flat surface, will be parallel to the optical axis L2. The distance between the flange bottom surface 63 and the optical axis L2 of the imaging lens 25 in the Z direction is determined such that the optical axis L2 of the imaging lens 25 aligns with the optical axis L1 of the area sensor 23, as the optical axis L, when the bottom surface 63 is slidably brought into surface contact with the top surface 54 of the holder 50.

The flange 62 has a length in the X direction which is determined so that the flange bottom surface 63 constantly covers the opening 55 when brought into slidable contact. The flange 62 has a top surface which is provided with a pair of concave engagement portions 64 used during slide adjustment, and a pair of adhesive grooves 65 used for adhesion and fixation after slide adjustment. The adhesive grooves 65 are formed into a long shape in the X direction so as to communicate with the respective adhesive grooves 53a at any slide adjustment position. It should be noted that the flange bottom surface 63 may correspond to an example of the "reference surface" and the "first reference surfaces".

As shown in parts (A) to (C) of FIG. 4, when the lens retainer 60 is assembled into the holder 50, the retainer body 61 to be located closer to the imaging lens 25 than to the flange 62 is housed in the holder 50 via the opening 55, in a state in which the flange bottom surface 63 is in surface contact with the top surface 54 and the end faces 61a and 61b are respectively in surface contact with the edge faces 56a and 56b. Furthermore, as will be described later, sliding of the lens retainer 60 in the X direction relative to the holder 50 is adjusted using the engagement portions 64, so that the relative positions of the area sensor 23 and the imaging lens 25 may agree with an optimal focus position. Then, a UV adhesive is applied from the adhesive grooves 65 into the adhesive grooves 53a to assemble the lens retainer 60 into the holder 50, disabling sliding.

The microcomputer system includes an amplifying circuit 31, an A/D conversion circuit 33, a memory 35, an address generation circuit 36, a synchronous signal generation circuit 38, a control unit 40, an operation device 42, a liquid crystal display 43, a buzzer 44, a vibrator 45, a light emitting part 46 and a communication interface 48. The microcomputer system mainly includes the control unit 40 and the memory 35 which serve as a microcomputer (information processor). The microcomputer system can have both a hardware aspect and a software aspect of processing a signal of an image of an information code captured by the optical system described above.

The control unit 40 controls the entire system of the optical information reader 10.

The area sensor 23 of the optical system outputs an image signal (analog signal) which is inputted to the amplifying circuit 31 for amplification at a predetermined amplification factor. The amplified signal is then inputted to the A/D conversion circuit 33 for conversion from the analog signal into a digital signal. Then, the digitized image signal, i.e., image data (image information), is formed and inputted to the memory 35 for storage in a predetermined code image information storage area. The synchronous signal generation circuit 38 is constituted so that it can generate a synchronous signal for the area sensor 23 and the address generation circuit 36. The address generation circuit 36 is constituted so that it can generate a storage address of image data to be stored in the memory 35, based on the synchronous signal supplied from the synchronous signal generation circuit 38.

The memory 35 is a semiconductor memory device. For example, RAM (DRAM, SRAM or the like) or ROM (EPROM, EEPROM or the like) corresponds to the memory 35. Of these devices for the memory 35, RAM is constituted to ensure an area for a workspace that is used when the control unit 40 performs operation, such as arithmetic operation, logical operation or the like, and an area for a reading condition table, in addition to the code image information storage area mentioned above. The ROM stores in advance a reading program enabling execution of reading processing for optically reading an information code, a system program enabling control of hardware, e.g., the illuminant 21 or the area sensor 23, and other programs.

The control unit 40, which is a microcomputer capable of controlling the entire optical information reader 10, includes a CPU, a system bus and an I/O interface. The control unit 40 constitutes an information processor together with the memory 35, and thus has an information processing function. The control unit 40 has a function of decrypting (decoding) an image of an information code captured by the area sensor 23 and stored in the memory 35. The control unit 40 is constituted so that it can be connected to various I/O devices (peripheral devices) via the incorporated I/O interface. In the present embodiment, the control unit 40 is connected to the operation device 42, the liquid crystal display 43, the buzzer 44, the vibrator 45, the light emitting part 46, the communication interface 48 and other components.

The operation device 42 includes a plurality of keys and is ensured to send an operation signal to the control unit 40 according to user's key operation. When an operation signal is received from the operation device 42, the control unit 40 is ensured to operate according to the operation signal. The liquid crystal display 43 includes a known liquid crystal panel and is ensured to be controlled by the control unit 40 in terms of the contents to be displayed. The buzzer 44 is constituted by a known buzzer and is ensured to generate predetermined sound according to an operation signal from the control unit 40.

The vibrator 45 is constituted by a known vibrator to be mounted to a portable device and is ensured to generate vibration according to a drive signal sent from the control unit 40. The light emitting part 46 is a LED, for example, and is ensured to be lit according to a signal sent from the control unit 40. The communication interface 48 is constituted as an interface performing data communication with an external device (e.g., host device) and is ensured to perform communication processing in cooperation with the control unit 40.

Next, specific configurations of the holder 50 and the lens retainer 60 will be described.

Figure 6:
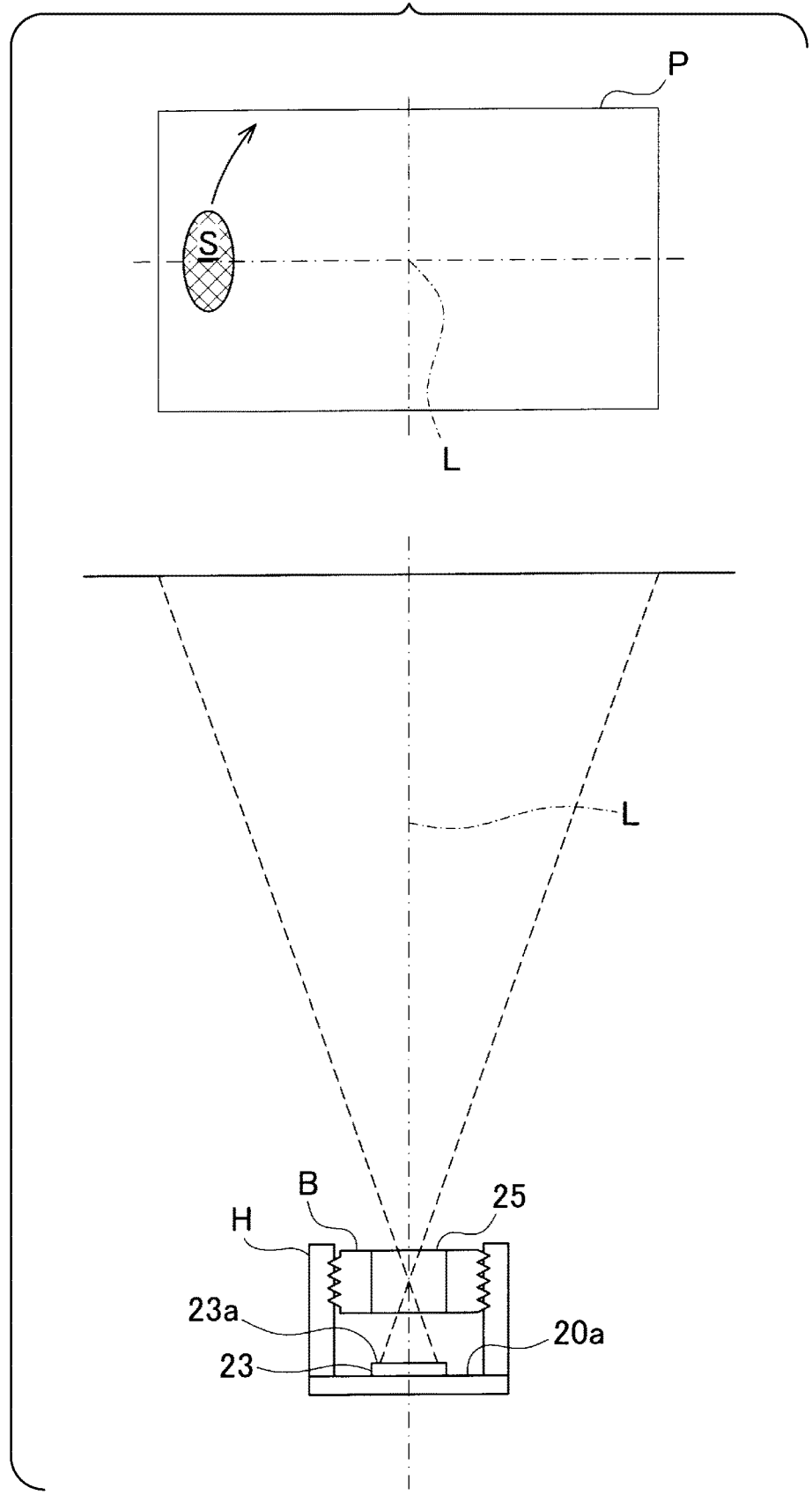
FIG. 6 is a diagram illustrating a position of a one-sided blur portion relative to an imaging field of view when an imaging lens is moved relative to an area sensor, according to the conventional art.

As mentioned above, imaging lenses may suffer from one-sided blur that deteriorates performance relating to imaging in part of the peripheral field of view due to manufacturing variation or the like. In conventional structures, relative positions of the area sensor 23 and the imaging lens 25 have been adjusted according to the amount of threadable engagement of a lens barrel B retaining the imaging lens 25 with a holder H. In such conventional structures, as in an imaging field of view P shown in FIG. 6, a one-sided blur portion S is involved in rotation about the optical axis L during adjustment (see the arrow of FIG. 6). Thus, if the one-sided blur portion S rotates and moves, resolution may vary according to the position of the one-sided blur portion S. Therefore, even when the relative positions of the area sensor 23 and the imaging lens 25 have agreed with an optimal focus position, resolution as measured may be underrated.

In this regard, the present embodiment uses the holder 50 and the lens retainer 60 as described above to slide the imaging lens 25 relative to the area sensor 23 along the optical axis L to adjust their relative positions. Specifically, the lens retainer 60 is slidably guided relative to the holder 50 in the optical axis direction (X direction) in a state in which the flange bottom surface 63 is slidably in contact with the top surface 54, and the end faces 61a and 61b are respectively slidably in contact with the edge faces 56a and 56b of the opening 55. Thus, the relative positions of the imaging lens 25 and the area sensor 23 can be adjusted without allowing the imaging lens 25 to rotate or move.

Then, a given tool is brought into engagement with the engagement portions 64 formed in the flange 62. In this state, the lens retainer 60 is permitted to gradually slide against the holder 50 to sequentially measure resolution. Since the influence of one-sided blur is minimized in terms of variation in resolution measured in this way, the slide positions (relative positions) where resolution is most highly rated are taken to correspond to an optimal focus position. As a result of the lens retainer 60 and the holder 50 being positionally adjusted, a UV adhesive is applied from the adhesive grooves 65 of the lens retainer 60 into the adhesive grooves 63a of the holder 50 for adhesion and fixation. Thus, the lens retainer 60 is assembled into the holder 50 at positions corresponding to an optimal focus position, disabling slidable movement against the holder 50.

Figure 5:
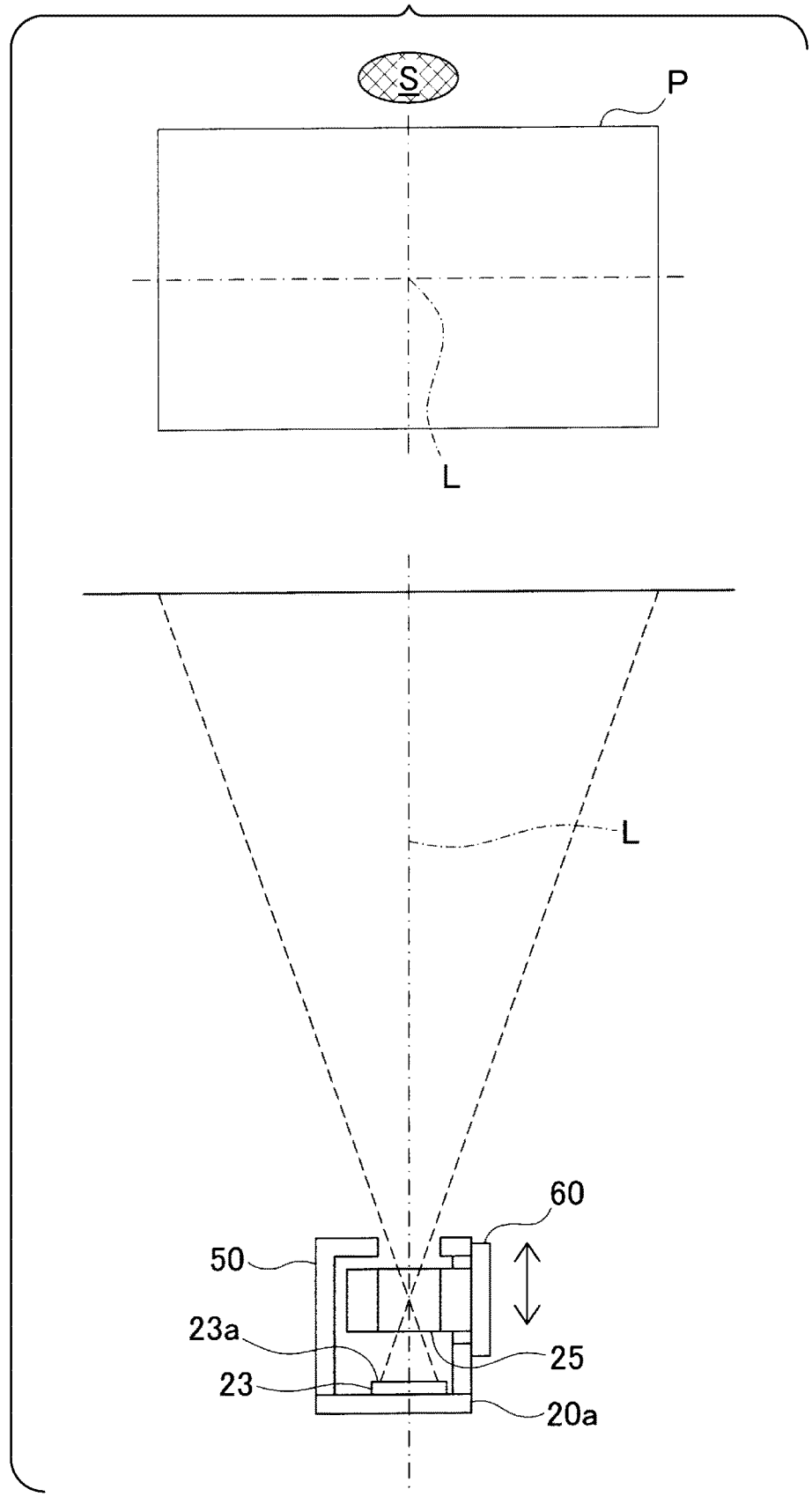
FIG. 5 is a diagram illustrating a position of a one-sided blur portion relative to an imaging field of view when an imaging lens is moved relative to an area sensor, according to the present invention.

In particular, in the present embodiment, the position occurring one-sided blur is confirmed for each imaging lens 25. Thus, as can be understood from the imaging field of view P shown in FIG. 5, the imaging lens 25 is retained by the lens retainer 60 so that the one-sided blur portion S is located outside the light-receiving surface 23a near a long side thereof. Thus, when resolution is measured while the lens retainer 60 is slidably moved against the holder 50, the one-sided blur portion S is prevented from being imaged.

As described above, in the optical information reader 10 of the present embodiment, the lens retainer 60 is assembled into the holder 50 in a state in which the lens retainer 60 retains the imaging lens 25. Specifically, the lens retainer 60 has the bottom surface 63 parallel to the optical axis L1 of the imaging lens 25, and end faces 61a and 61b, which are formed as a reference surface. The holder 50 has the top surface 54, and the edge faces 56a and 56b of the opening 55, which are formed as a guide surface. The reference surface is brought into surface contact with the guide surface when the lens retainer 60 is assembled into the holder 50 so that light entering through the imaging lens 25 produces an image on the area sensor 23. Furthermore, the reference surface is brought into slidable contact with the guide surface when the lens retainer 60 is moved along the optical axis L.

Thus, when adjusting the relative positions of the area sensor 23 and the imaging lens 25, the lens retainer 60 is moved along the optical axis L relative to the holder 50 such that the flange bottom surface 63 and the end faces 61a and 61b are respectively brought into slidable contact with the top surface 54 and the edge faces 56a and 56b of the opening 55. Specifically, even when there is one-sided blur in the imaging lens 25, the one-sided blur portion S does not rotate or move when an optimal focus position is found by changing relative positions of the area sensor 23 and the imaging lens 25. Therefore, the influence of one-sided blur can be minimized in terms of variation in resolution to be measured.

Furthermore, the area sensor 23 has a rectangular light-receiving surface 23a, and the position causing one-sided blur is confirmed for each imaging lens 25. The lens retainer 60 retains the imaging lens 25 so that the one-sided blur portion S is located outside the light-receiving surface 23a near a long side thereof. Thus, unlike the case where the imaging lens is retained so that the one-sided blur portion S is located near a short side of the light-receiving surface, the one-sided blur portion S can be easily brought to a position outside the imaging field of view of the area sensor 23. Consequently, the influence of one-sided blur can be minimized and resolution can be improved.

If the position causing one-sided blur is not confirmed for each imaging lens 25 and if a one-sided blur portion S resides in the light-receiving surface 23a, the influence of one-sided blur can be minimized in terms of variation in resolution to be measured, because use of the lens retainer 60 and the holder 50 described above does not allow rotation or movement of the one-sided blur portion S.

In particular, the lens retainer 60 has the reference surface including the flange bottom surface 63 serving as a planar first reference surface, and end faces 61a and 61b serving as planar second reference surfaces. The holder 50 has the guide surface including the top surface 54 serving as a planar first guide surface that can be slidably in contact with the first reference surface, and the edge faces 56a and 56b of the opening 55 serving as planar second guide surfaces that can be slidably in contact with the respective second reference surfaces. Thus, by constituting each of the reference surface and the guide surface with two types of planar surfaces, a configuration in which the lens retainer 60 is moved along the optical axis L relative to the holder 50 can be easily achieved.

The first reference surface and the second reference surfaces of the lens retainer 60 may be provided so that the former intersects the latter at an angle other than 90°, and the first guide surface and the second guide surfaces of the holder 50 may be provided so as to be slidably in contact with the respective first and second reference surfaces intersecting in this way. With this configuration as well, the configuration for moving the lens retainer 60 along the optical axis L relative to the holder 50 can be easily achieved.

The flange 62 of the lens retainer 60 has the flange bottom surface 63 on the imaging lens 25 side to serve as the first reference surface. The holder 50 is formed so that the retainer body 61, which is located closer to the imaging lens 25 than to the flange 62 of the lens retainer 60, is housed via the opening 55 when assembled. The top surface 54 of the holder 50, in which the opening 55 is formed, serves as the first guide surface. This configuration may facilitate not only assemblage of the lens retainer 60 into the holder 50, but also facilitate surface contact of the first reference surface with the first guide surface during assemblage.

Furthermore, the flange 62 is formed so that the flange bottom surface 63 covers the opening 55 when brought into slidable contact with the top surface 54. Thus, since the flange 62 serves as a light shielding member for preventing entry of light via the opening 55, light shielding effect of the holder 50 can be improved.

The lens retainer 60 is provided with a pair of concave engagement portions 64 used when the lens retainer 60 is moved along the optical axis L relative to the holder 50. Therefore, relative movement of the lens retainer 60 along the optical axis L can be performed with accuracy to reliably perform adjustment for determining an optimal focus position. The engagement portions 64 do not necessarily have to have a concave shape but may have a convex shape, for example, as long as the engagement portions 64 can engage with a tool used for slide adjustment.

Second Embodiment

Figure 7:
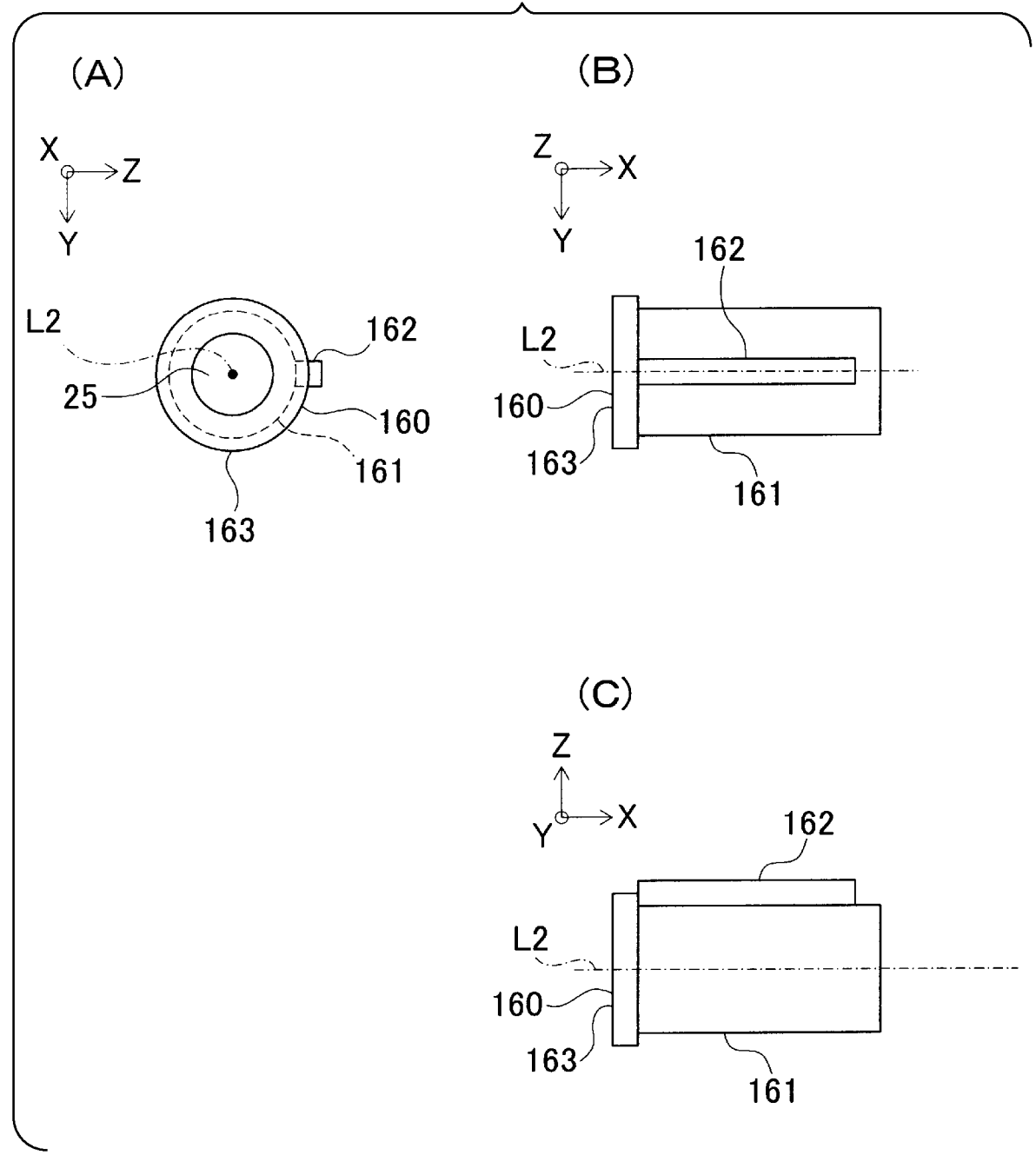
FIG. 7 is a set of diagrams each illustrating a configuration of a holder according to a second embodiment, in which a part (A) of FIG. 7 is a front view, a part (B) of FIG. 7 is a plan view and a part (C) of FIG. 7 is a side view.
Figure 8:
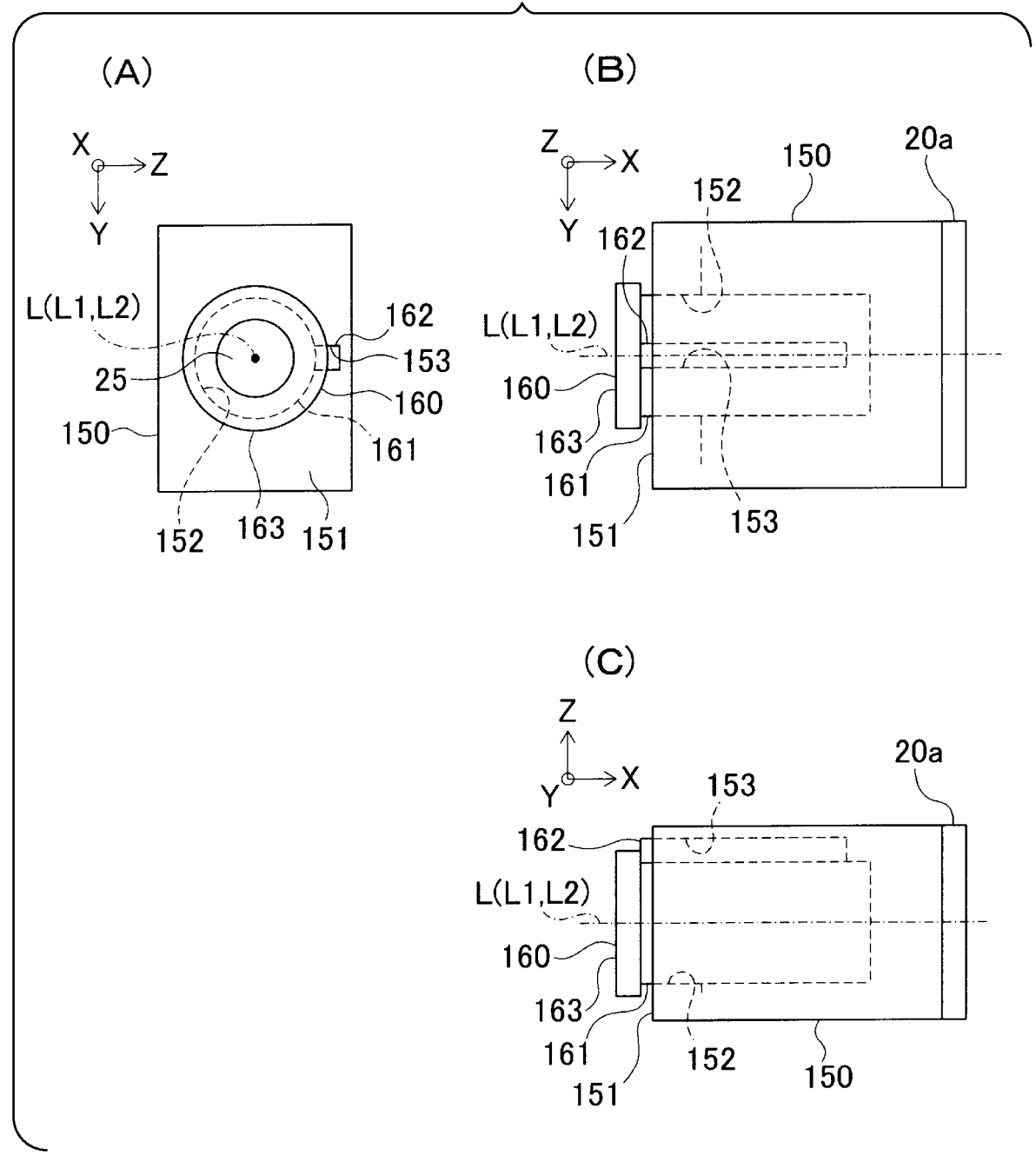
FIG. 8 is a set of diagrams each illustrating a state in which the lens retainer has been assembled to the holder according to the second embodiment, in which a part (A) of FIG. 8 is a front view, a part (B) of FIG. 8 is a plan view and a part (C) of FIG. 8 is a side view.

Referring now to FIGS. 7 and 8, an optical information reader according to a second embodiment will be described.

The second embodiment is mainly different from the first embodiment in that a holder 150 and a lens retainer 160 are used instead of the holder 50 and the lens retainer 60.

Specifically, as shown in FIGS. 7 and 8, the lens retainer 160 retaining the imaging lens 25 has an outer peripheral surface (outer surface) 161 having a circular cross section as viewed perpendicularly to a plane through which an optical axis L passes. The outer peripheral surface 161 has a top on which a projection 162 is formed extending in the optical axis direction. On a reading window 13 side of the lens retainer 160, there is provided a flange 163 used for slide adjustment.

The holder 150, to which the area sensor 23 is fixed, has no opening 55 unlike in the holder 50 described above, but has an end portion 151 which is provided with an opening 152 having an inner surface for slidable contact with the outer peripheral surface 161 of the lens retainer 160. The inner surface of the opening 152 has an upper portion where there is provided a recess 153 having an inner surface which is brought into slidable contact with at least a part of a top surface and side faces of the projection 162 of the lens retainer 160.

Specifically, in the present embodiment, the first reference surface and the second reference surfaces are formed using the outer peripheral surface 161 of the lens retainer 160 and the projection 162 provided to the outer peripheral surface 161. The first guide surface and the second guide surfaces are formed using the inner surface of the opening 152 of the holder 150 and the recess 153 formed in the inner surface of the opening 152.

When adjusting the relative positions of the area sensor 23 and the imaging lens 25 in this configuration as well, the lens retainer 160 can be moved relative to the holder 150 along the optical axis L such that the outer peripheral surface 161 and the projection 162 are brought into slidable contact with the inner surfaces of the opening 152 and the recess 153. Thus, the one-sided blur portion S does not rotate or move when determining an optimal focus position by changing the relative positions of the area sensor 23 and the imaging lens 25. Thus, the influence of one-sided blur can be minimized in terms of variation in resolution to be measured.

The lens retainer 160 may be formed so that only a lower portion of the outer peripheral surface 161 is brought into slidable contact with the inner surface of the opening 152 of the holder 150, and the top surface and the side faces of the projection 162 may be ensured to serve as the first reference surface and the second reference surfaces.

Third Embodiment

Figure 9:
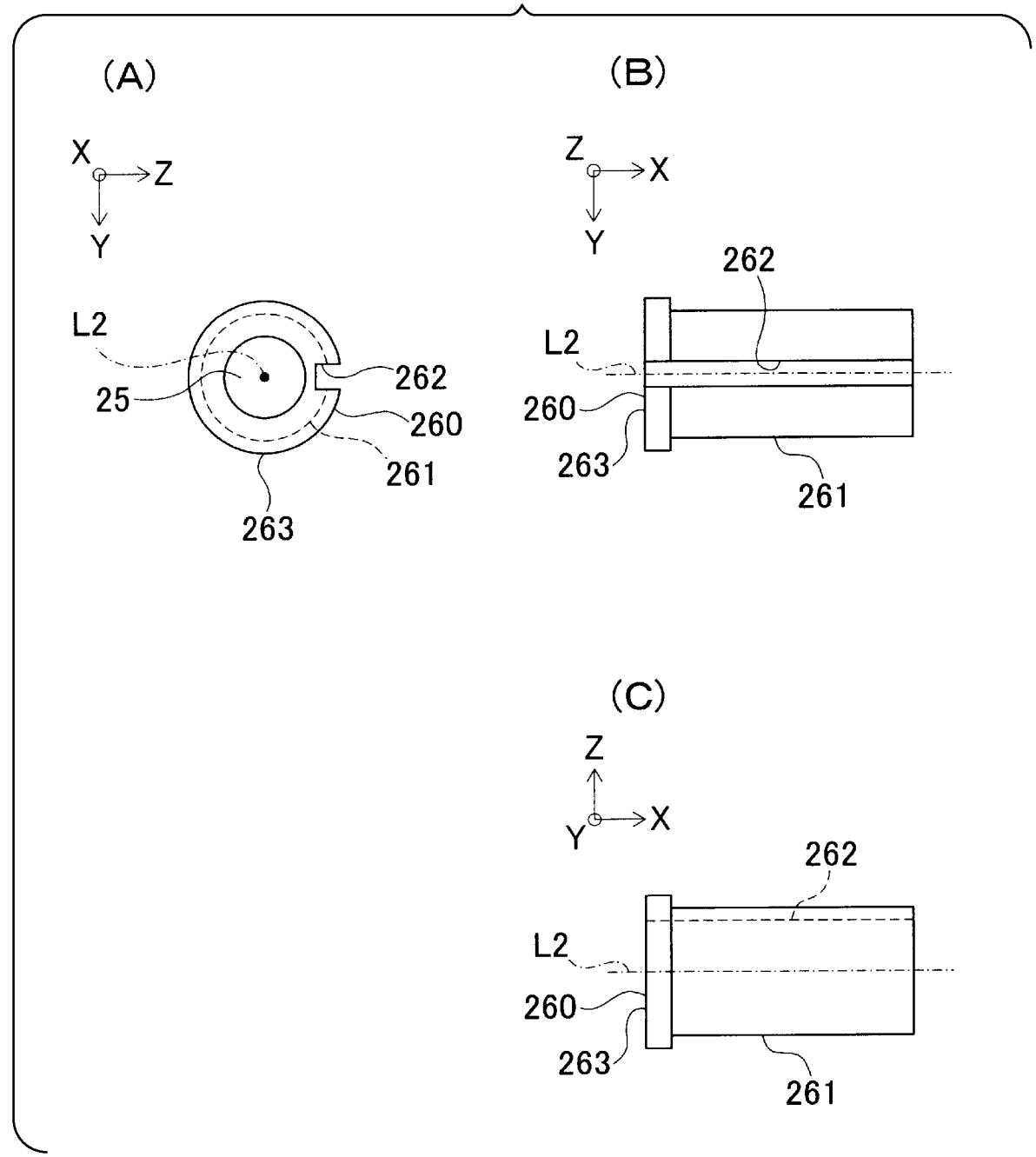
FIG. 9 is a set of diagrams each illustrating a configuration of a holder according to a third embodiment, in which a part (A) of FIG. 9 is a front view, a part (B) of FIG. 9 is a plan view and a part (C) of FIG. 9 is a side view.
Figure 10:
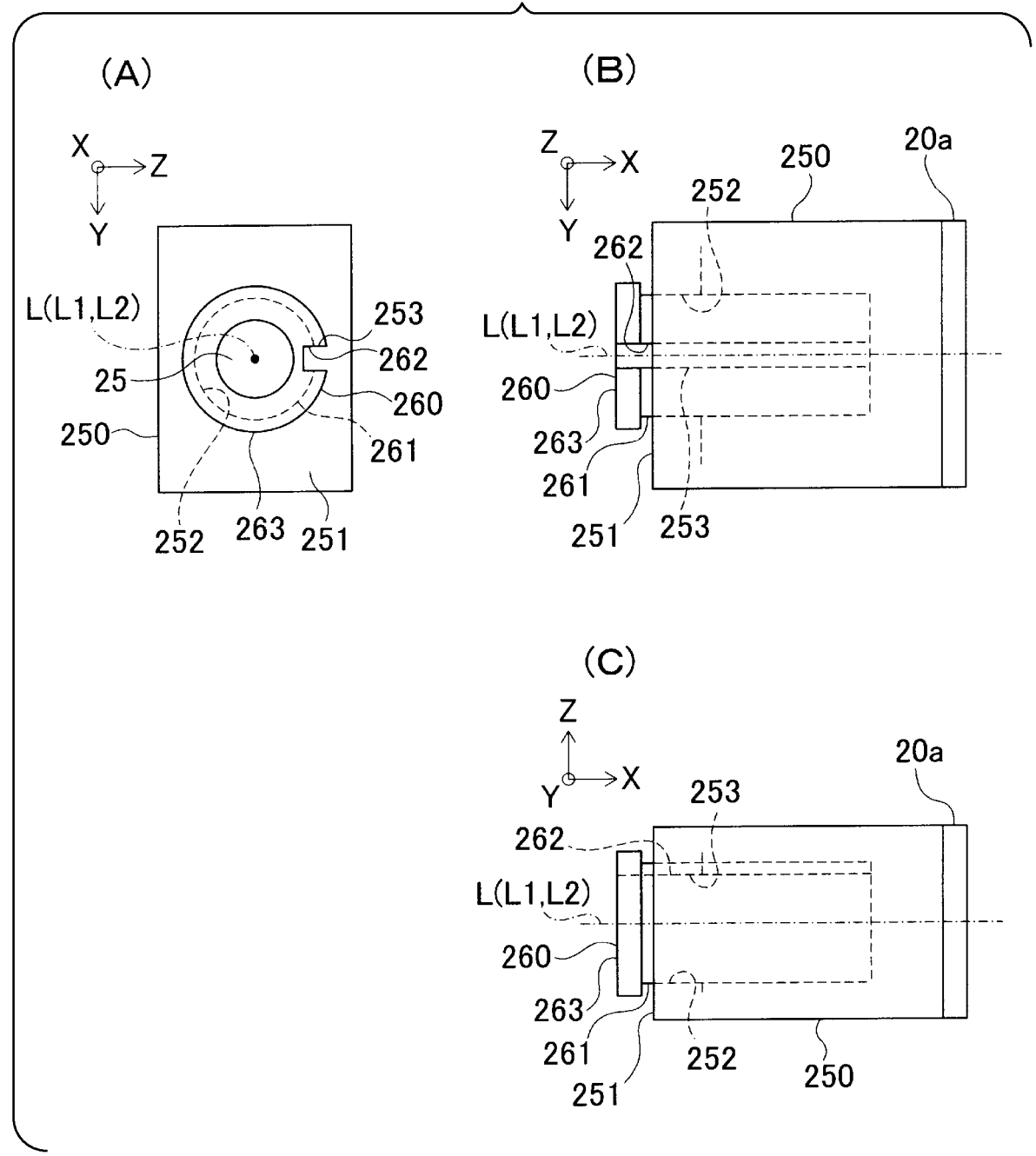
FIG. 10 is a set of diagrams each illustrating a state in which the lens retainer has been assembled to the holder according to the third embodiment, in which a part (A) of FIG. 10 is a front view, a part (B) of FIG. 10 is a plan view and a part (C) of FIG. 10 is a side view.

Referring to FIGS. 9 and 10, an optical information reader according to a third embodiment will be described.

The third embodiment is mainly different from the first embodiment in that a holder 250 and a lens retainer 260 are used instead of the holder 50 and the lens retainer 60.

Specifically, as shown in FIGS. 9 and 10, the lens retainer 260 retaining the imaging lens 25 has an outer peripheral surface (outer surface) 261 having a circular cross section as viewed perpendicularly to a plane through which the optical axis L (L2) passes. The outer peripheral surface 261 has an upper portion in which a recess 262 is formed extending in the optical axis direction. On a reading window 13 side of the lens retainer 160, there is provided a flange 263 used for slide adjustment.

The holder 250, to which the area sensor 23 is fixed, has no opening 55 unlike in the holder 50 described above, but has an end portion 251 which is provided with an opening 252 having an inner surface for slidable contact with the outer peripheral surface 261 of the lens retainer 260. The opening 252 has an upper portion where there is provided a projection 253 which is brought into slidable contact with at least a part of a bottom surface and side faces of the recess 262 of the lens retainer 260.

Specifically, in the present embodiment, the first reference surface and the second reference surfaces are formed using the outer peripheral surface 261 of the lens retainer 260 and the recess 262 formed in the outer peripheral surface 261. The first guide surface and the second guide surfaces are formed using the inner surface of the opening 252 of the holder 150 and the projection 253 formed in the inner surface of the opening 252.

When adjusting the relative positions of the area sensor 23 and the imaging lens 25 in this configuration as well, the lens retainer 260 can be moved relative to the holder 250 along the optical axis L such that the outer peripheral surface 261 and the inner surface of the recess 262 are brought into slidable contact with the inner surface of the opening 252 and the projection 253. Thus, the one-sided blur portion S does not rotate or move when determining an optimal focus position by changing the relative positions of the area sensor 23 and the imaging lens 25. Thus, the influence of one-sided blur can be minimized in terms of variation in resolution to be measured.

The lens retainer 260 may be formed so that only a lower portion of the outer peripheral surface 261 is brought into slidable contact with the inner surface of the opening 252 of the holder 250, and the bottom surface and the side faces of the recess 262 may be ensured to serve as the first reference surface and the second reference surfaces.

Fourth Embodiment

Figure 11:
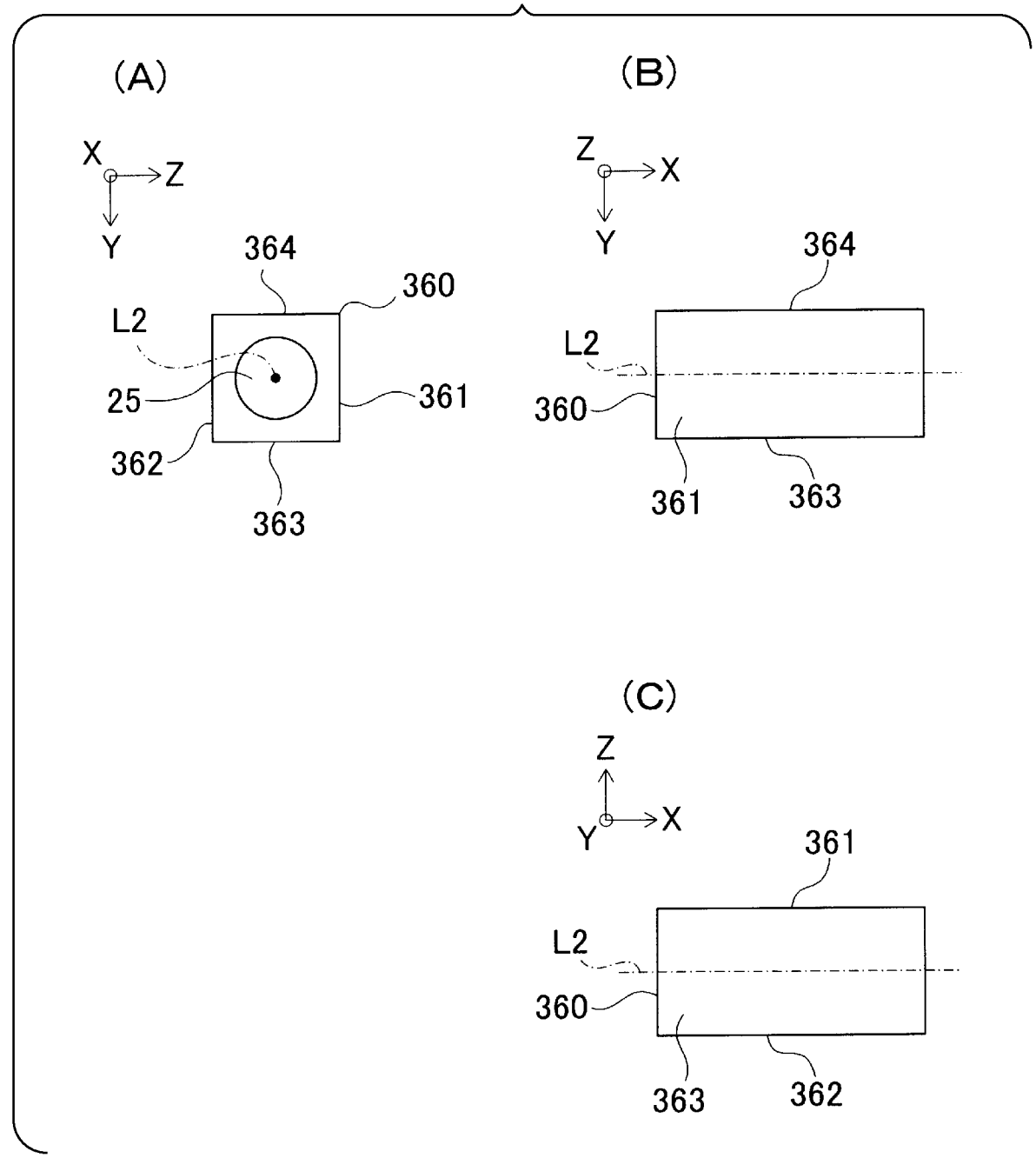
FIG. 11 is a set of diagrams each illustrating a configuration of a holder according to a fourth embodiment, in which a part (A) of FIG. 11 is a front view, a part (B) of FIG. 11 is a plan view and a part (C) of FIG. 11 is a side view.
Figure 12:
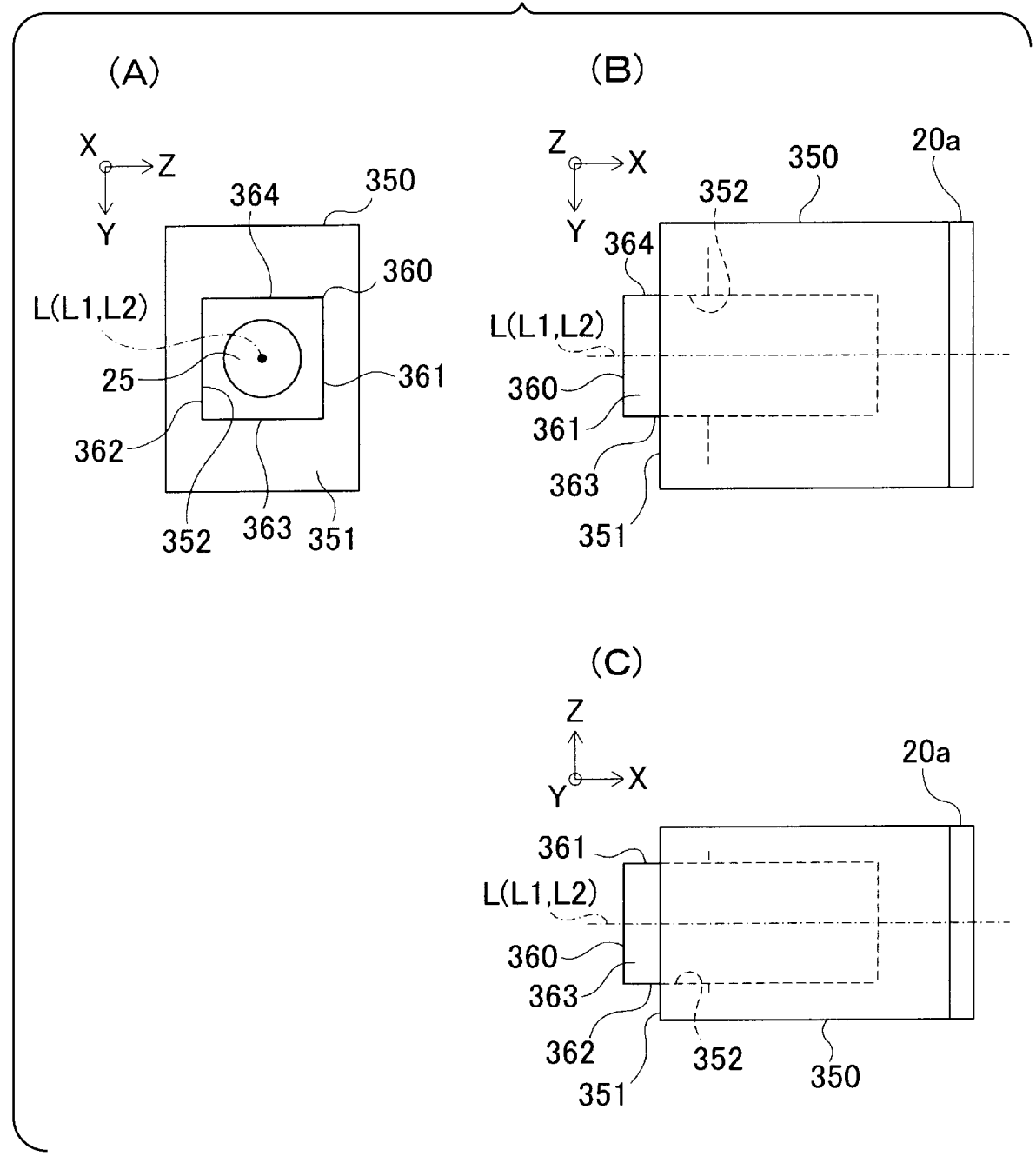
FIG. 12 is a set of diagrams each illustrating a state in which the lens retainer has been assembled to the holder according to the fourth embodiment, in which a part (A) of FIG. 12 is a front view, a part (B) of FIG. 12 is a plan view and a part (C) of FIG. 12 is a side view.

Referring to FIGS. 11 and 12, an optical information reader according to a fourth embodiment will be described.

The fourth embodiment is mainly different from the first embodiment in that a holder 350 and a lens retainer 360 are used instead of the holder 50 and the lens retainer 60.

Specifically, as shown in FIGS. 11 and 12, the lens retainer 360 retaining the imaging lens 25 has a top surface 361 a bottom surface 362 and side faces 363 and 364 so that the lens retainer 360 has a square cross section as viewed perpendicularly to a plane through which the optical axis L (L2) passes.

The holder 350, to which the area sensor 23 is fixed, has no opening 55 unlike in the holder 50 described above, but has an end portion 351 which is provided with a square opening 352 having an inner surface for slidable contact with the top surface 361, the bottom surface 362 and the side faces 363 and 364 of the lens retainer 360.

Specifically, in the present embodiment, the first reference surface and the second reference surfaces are formed using the top surface 361, the bottom surface 362 and the side faces 363 and 364 of the lens retainer 360. The first guide surface and the second guide surfaces are formed using the inner surface of the opening 352 of the holder 350.

When adjusting the relative positions of the area sensor 23 and the imaging lens 25 in this configuration as well, the lens retainer 360 can be moved relative to the holder 350 along the optical axis L such that the top surface 361, the bottom surface 362 and the side faces 363 and 364 of the lens retainer 360 are brought into slidable contact with the inner surface of the opening 352. Thus, the one-sided blur portion S does not rotate or move when determining an optimal focus position by changing the relative positions of the area sensor 23 and the imaging lens 25. Thus, the influence of one-sided blur can be minimized in terms of variation in resolution to be measured.

The lens retainer 360 is not limited to have a square cross section defined by the top surface 361, the bottom surface 362 and the side faces 363 and 364 of the lens retainer 360 as viewed perpendicularly to a plane through which the optical axis L passes. For example, the lens retainer 360 may have a polygonal cross section, including rectangular and pentagonal cross sections.

Fifth Embodiment

Figure 14:
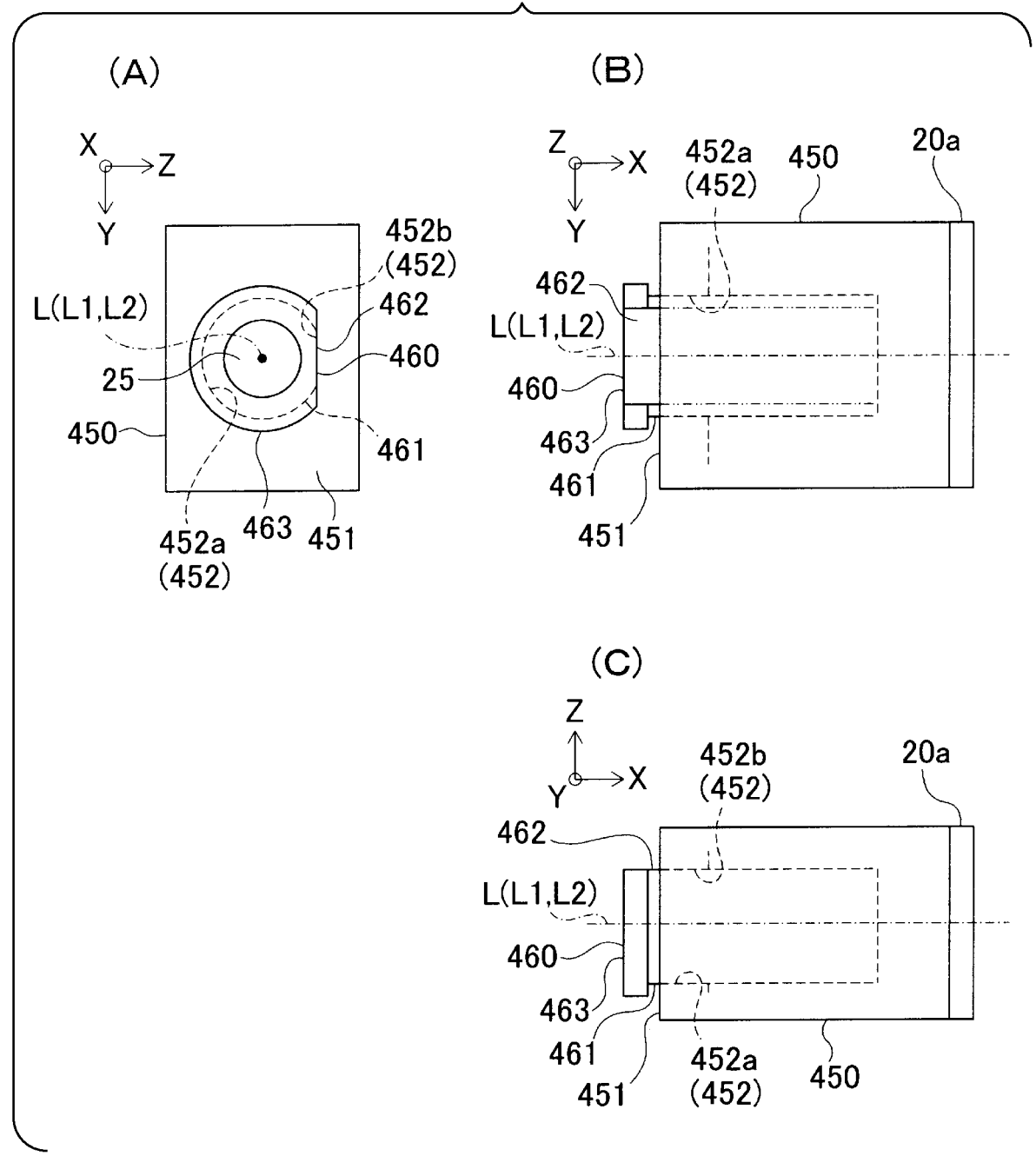
FIG. 14 is a set of diagrams each illustrating a state in which the lens retainer has been assembled to the holder according to the fifth embodiment, in which a part (A) of FIG. 14 is a front view, a part (B) of FIG. 14 is a plan view and a part (C) of FIG. 14 is a side view.

Referring to FIGS. 13 and 14, an optical information reader according to a fifth embodiment will be described.

The fifth embodiment is mainly different from the first embodiment in that a holder 450 and a lens retainer 460 are used instead of the holder 50 and the lens retainer 60.

Specifically, as shown in FIGS. 13 and 14, the lens retainer 460 retaining the imaging lens 25 has an outer peripheral surface 461 whose upper portion is provided with a flat surface 462 so that the lens retainer 460 has an arc cross section (arched cross section) as viewed perpendicularly to a plane through which the optical axis L (L2) passes. On a reading window 13 side of the lens retainer 460, there is provided a flange 463 used for slide adjustment.

The holder 450, to which the area sensor 23 is fixed, has no opening 55 unlike in the holder 50 described above, but has an end portion 451 which is provided with an opening 452 having an inner surface for slidable contact with the outer peripheral surface 461 and the flat surface 462 of the lens retainer 460.

Specifically, in the present embodiment, the first reference surface and the second reference surfaces are formed using the outer peripheral surface 461 and the flat surface 462 of the lens retainer 460. The first guide surface and the second guide surfaces are formed using the inner surfaces 452a and 452b of the opening 452 of the holder 450.

When adjusting the relative positions of the area sensor 23 and the imaging lens 25 in this configuration as well, the lens retainer 460 can be moved relative to the holder 450 along the optical axis L such that the outer peripheral surface 461 and the flat surface 462 are brought into slidable contact with the inner surfaces 452a and 452b of the opening 452. Thus, the one-sided blur portion S does not rotate or move when determining an optimal focus position by changing the relative positions of the area sensor 23 and the imaging lens 25. Thus, the influence of one-sided blur can be minimized in terms of variation in resolution to be measured.

Sixth Embodiment

Referring to the drawings, a method of manufacturing an optical information reader according to a sixth embodiment will be described.

The sixth embodiment is mainly different from the first embodiment in the process of assembling the lens retainer 60 and the holder 50 constituting the optical information reader 10. Specifically, in the present embodiment, to reliably perform adjustment for determining an optimal focus position, the lens retainer 60 is gradually slid against the holder 50 for sequential measurement of resolution, and then an arm, an X stage and other members are used for fixation.

Figure 15:
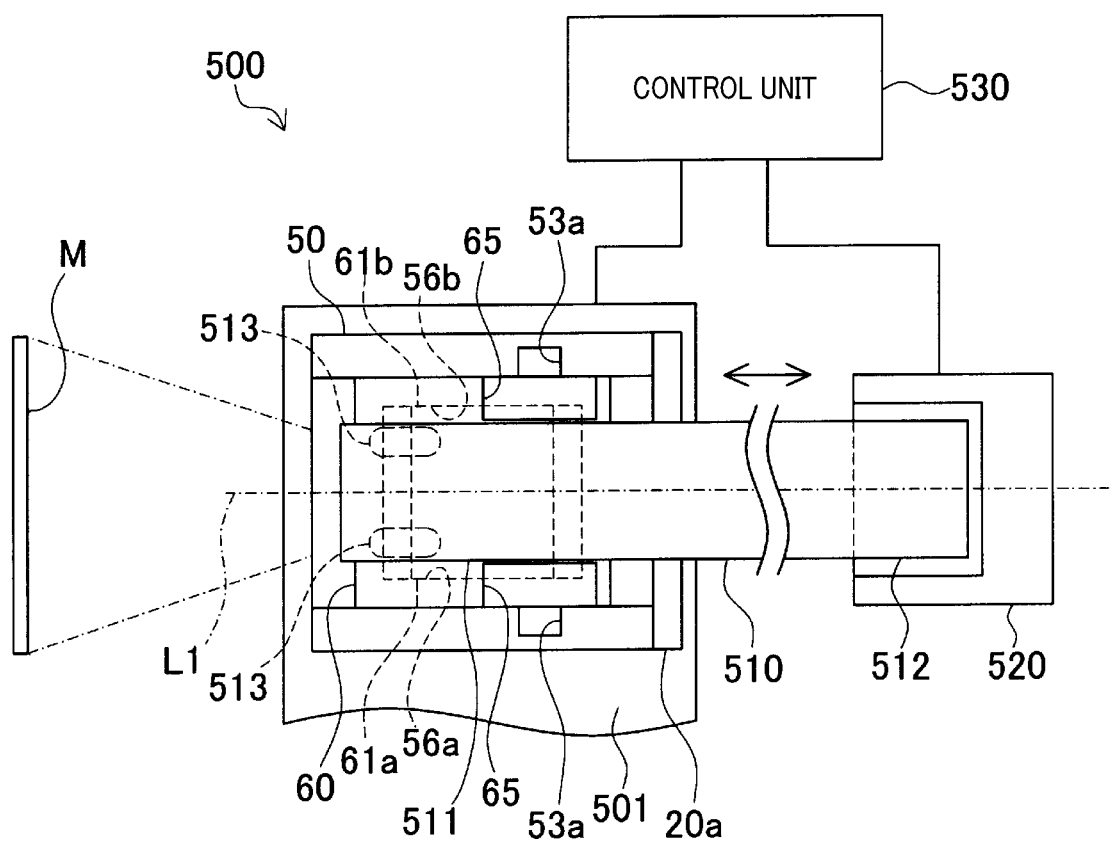
FIG. 15 is a schematic plan view illustrating a manufacturing device used for a method of manufacturing an optical information reader according to a sixth embodiment.
Figure 16:
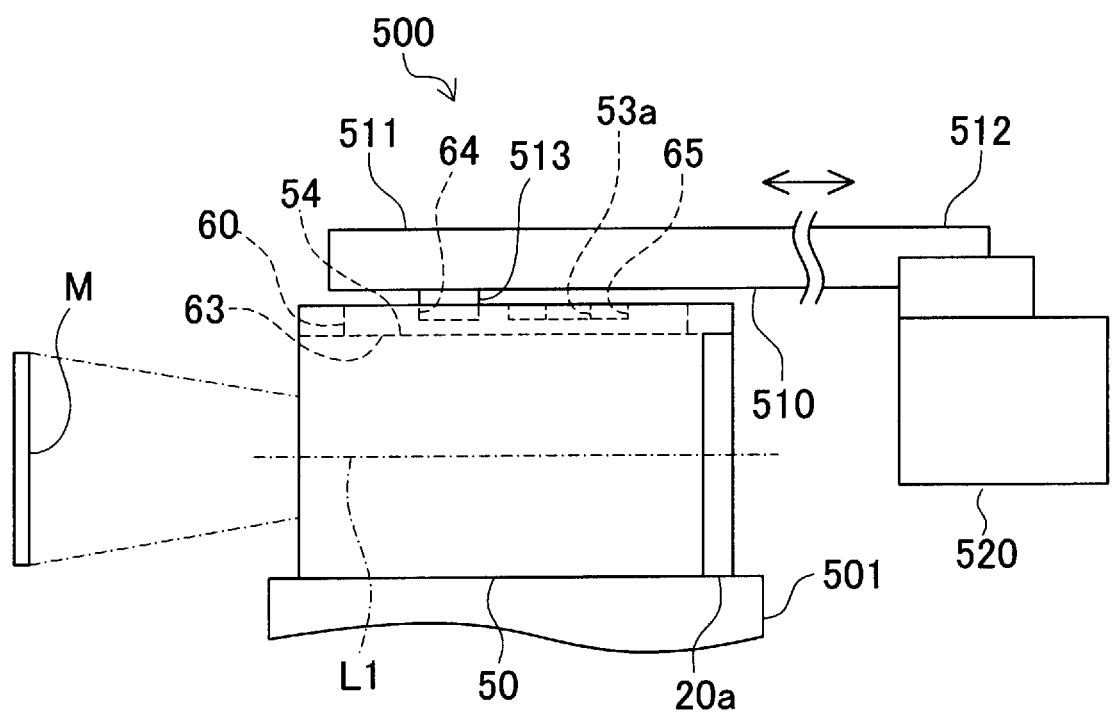
FIG. 16 is a schematic side view illustrating the manufacturing device used for the method of manufacturing the optical information reader according to the sixth embodiment.

As shown in FIGS. 15 and 16, the method of manufacturing the optical information reader 10 of the present embodiment uses a manufacturing apparatus 500 which mainly includes a placement table 501, an arm 510, an X stage 520 and a control unit 530. The placement table 501 is used for placing thereon a holder 50 into which a lens retainer 60 has been assembled but has not yet been adhered or fixed. The arm 510 and the X stage 520 are used for slidably moving (sliding) the lens retainer 60, which is placed on the placement table 501, relative to the holder 50. The control unit 530 is used for driving and controlling the X stage 520. Thus, adjustment for determining a focus position is made by sequentially measuring resolution using the area sensor 23 while the arm 510 is moved in a direction parallel to the optical axis L1, and fixing the lens retainer 60 to the holder 50 at a position where the measured resolution is regarded to be a peak.

The placement table 501 is constituted such that an image signal from the area sensor 23 of the holder 50 can be outputted to the control unit 530, by placing the holder 50 at a predetermined position of the placement table 501.

The arm 510 has a first end 511 and a second end 512. The first end 511 has a lower surface provided with a pair of engagement projections 513 for respective engagement with the engagement portions 64 of the lens retainer 60. To the second end 512, the X stage 520 is detachably mounted. The engagement projections 513 are formed such that there would be no allowance, after engagement, relative to the respective engagement portions 64 at least in a direction parallel to the optical axis L1 (X direction). The first end 511 of the arm 510 is formed so that the adhesive grooves 65 are exposed in a state in which the engagement projections 513 are engaged with the respective engagement portions 64.

The X stage 520, to which the second end 512 has been assembled, is a device for moving the arm 510 in a direction parallel to the optical axis L1. The direction of movement and the amount of movement of the arm 510 are ensured to be driven and controlled by the control unit 530.

The control unit 530 performs focus position adjustment processing to drive and control the X state 520 according to the resolution measured by the area sensor 23. As a result of the processing, an optimal focus position is found at some relative positions of the area sensor 23 fixed to the holder 50 and the imaging lens 25 retained by the lens retainer 60 provide. The control unit 530 may be configured as a control board including, for example, a CPU and a memory, or may be configured using an application program installed in a given terminal.

The following description specifically explains a manufacturing process performed when adhering and fixing the temporarily assembled lens retainer 60 and the holder 50 such that the relative positions of the area sensor 23 and the imaging lens 25 agree with an optimal focus position.

First, the lens retainer 60 retaining the imaging lens 25 is temporarily assembled into the holder 50 to which the area sensor 23 has been fixed, such that the bottom surface 63 and the end faces 61a and 61b are respectively brought into surface contact with the top surface 54 and the edge faces 56a and 56b. Then, the temporarily assembled holder 50 is placed at a predetermined position of the placement table 501. This brings about a state in which an image signal from the area sensor 23 can be outputted to the control unit 530.

Figure 17A:
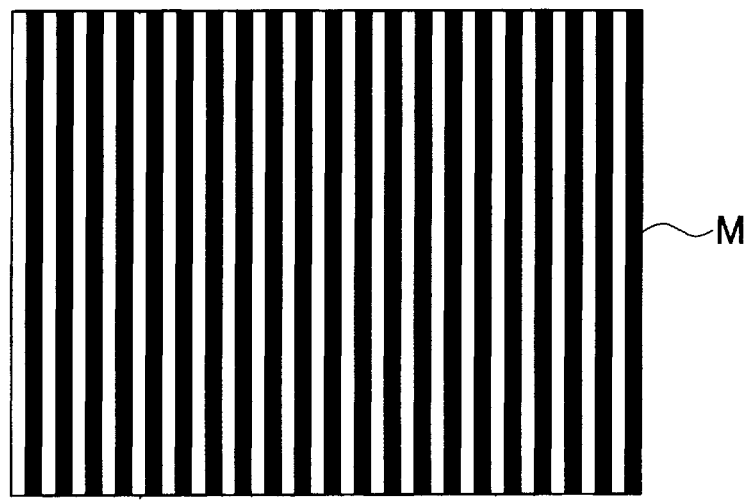
FIG. 17A illustrates an example of a chart used for measuring a contrast value.
Figure 17B:
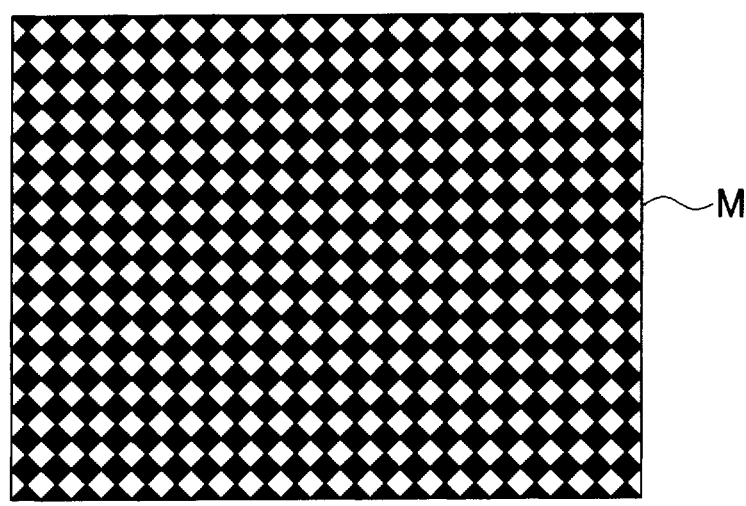
FIG. 17B illustrates another example of a chart used for measuring the contrast value.

Next, the engagement projections 513 are respectively brought into engagement with the engagement portions 64, so that the arm 510 assembled to the X state 520 is assembled to the lens retainer 60. Furthermore, as shown in FIGS. 15 and 16, a chart M shown in FIG. 17A or FIG. 17B is arranged at a position in an imaging field of view at which focus is desired to be adjusted.

Figure 18A:
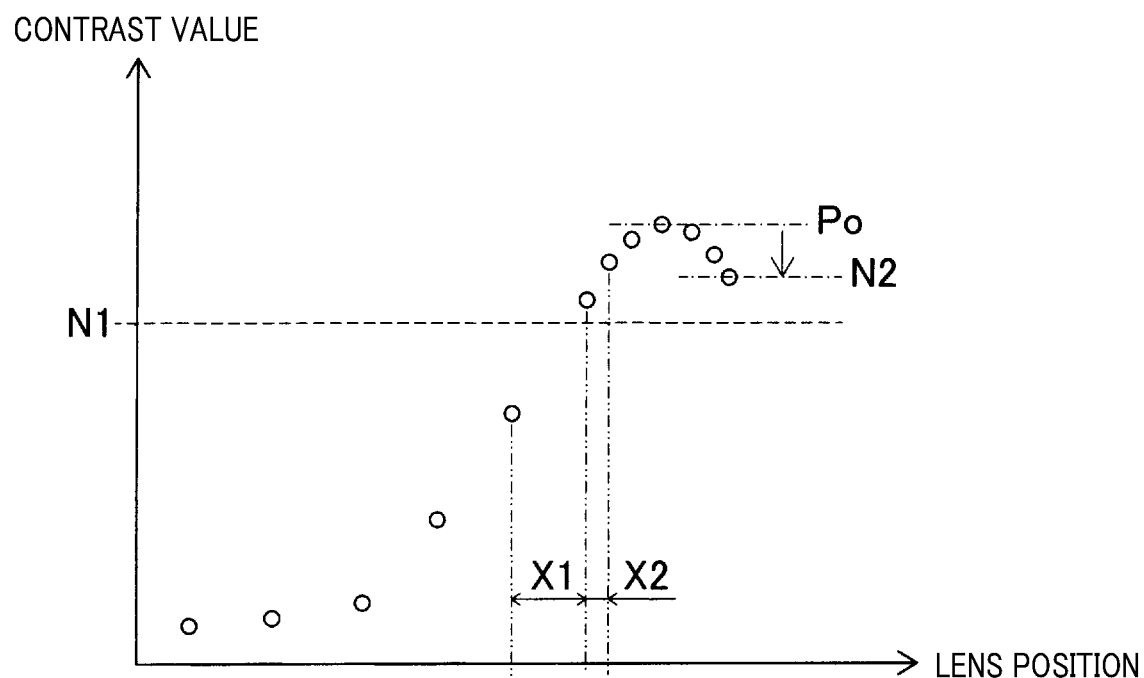
FIG. 18A illustrates measurements of contrast value when an arm has been moved in a first direction (i.e., in the other direction).

In this state, the focus position adjustment processing is started by the control unit 530. Specifically, the X stage 520 is driven and controlled to move the arm 510 according to the movement amount preset in a one direction parallel to the optical axis. Then, as shown in FIG. 18A, every time the arm 510 is moved, an image of the chart M is captured by the area sensor 23. Based on the output from the area sensor 23 when capturing an image, a contrast value is obtained and the obtained contrast value is measured as resolution.

The movement amount includes a movement amount X1 and a movement amount X2 with reference to a predetermined value N1. The predetermined value N1 serves as a reference value and is determined so as to be smaller than an expected peak value. The movement amount X1 is an amount at which a contrast value less than the predetermined value N1 is measured. The movement amount X2 is an amount at which a contrast value equal to or more than the predetermined value N1 is measured. The movement amount X2 herein is set to be smaller than the movement amount X1.

Figure 18B:
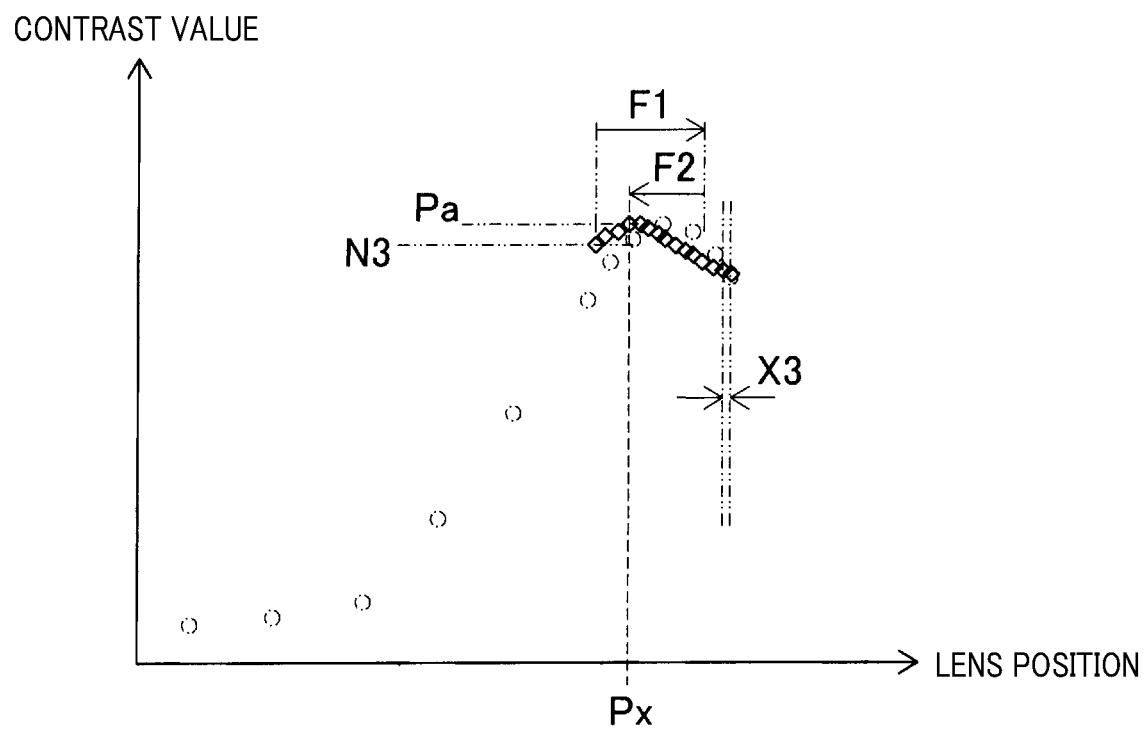
FIG. 18B illustrates measurements of contrast value when the arm has been moved in a second direction (i.e., in a one direction).

Contrast value measured with the movement of the arm 510 in the one direction mentioned above may reach a peak, then may start decreasing and then may become not more than a threshold N2 that has been set based on a previously measured maximum contrast value Po. In this case, movement of the arm 510 by the X stage 520 is stopped. Then, as shown in FIG. 18B, the arm 510 is moved to the other direction parallel to the optical axis L1, i.e., a direction opposite to the one direction mentioned above, to sequentially measure a contrast value.

In the present embodiment, a movement amount X3 during sequential movement in the other direction is set to be smaller than the movement amount X2. For example, if the movement amount X3 when moving in the other direction is taken to be one step, the movement amount X2 may correspond to five steps, and the movement amount X1 may correspond to ten steps.

Then, contrast value measured with the movement of the arm 510 in the other direction may reach a peak and then may start decreasing. Then, the previously measured maximum contrast value and the position of the lens retainer 60 at which this contrast value has been measured are respectively determined as a peak value Pa and a peak position Px.

After that, contrast value measured with the movement in the other direction may become equal to or less than a threshold N3 that is set based on the peak value Pa. Then, movement of the arm 510 by the X stage 520 is stopped.

Then, the arm 510 is moved in the one direction parallel to the optical axis L1 (see the arrow F1 of FIG. 18B), and then the arm 510 is moved in the other direction again toward the peak position Px (see the arrow F2 of FIG. 18B). Then, movement of the arm 510 by the X stage 520 is stopped at this peak position Px. It should be noted that the other direction parallel to the optical axis L1 may correspond to an example of a "first direction", and the one direction parallel to the optical axis L1 may correspond to a "second direction".

Figure 19:
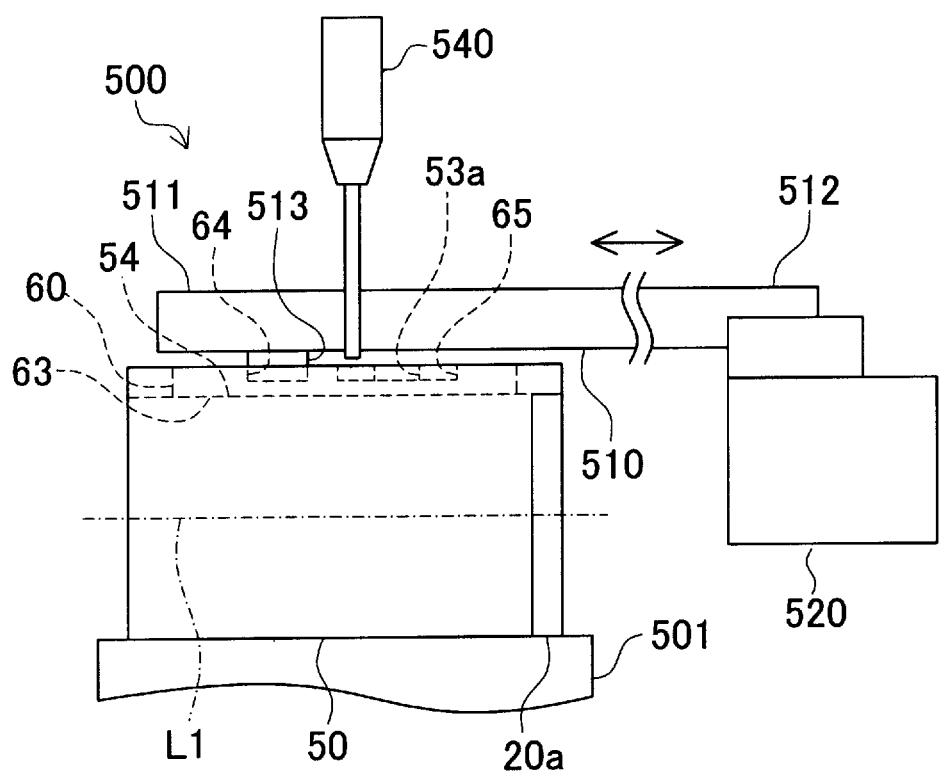
FIG. 19 is a diagram illustrating a state in which a UV adhesive is applied to adhesive grooves for a lens retainer and a holder which have moved to a peak position.

When the lens retainer 60 has been moved to the peak position Px in this way, a dispenser 540 for a UV adhesive is used, as shown in FIG. 19, to apply a UV adhesive from the adhesive grooves 65 into the adhesive grooves 53a. The UV adhesive is cured in this state using a UV light or the like to fix the lens retainer 60 to the holder 50 with the arm 510 being assembled thereto. When curing the UV adhesive, the arm 510 may be detached from the X stage 20.

After fixing the lens retainer 60 to the holder 50, the arm 510 is detached from the lens retainer 60 to thereby complete a light-receiving optical system in which the lens retainer 60 is fixed to the holder 50 at the peak position Px.

As described above, in the method of manufacturing the optical information reader according to the present embodiment, the lens retainer retaining the imaging lens 25 is assembled into the holder 50 to which the area sensor 23 has been fixed, such that the bottom surface 63 and the end faces 61a and 61b are respectively brought into surface contact with the top surface 54 and the edge surfaces 56a and 56b. Then, the arm 510 that is movable along the optical axis La is assembled to the lens retainer 60 and the arm 510 is moved in a direction parallel to the optical axis L1 so that the bottom surface 63 and the end faces 61a and 61b are respectively brought into slidable contact with the top surface 54 and the edge faces 56a and 56b. While the arm 510 is moved, the area sensor 23 is permitted to sequentially measure resolution (contrast value). Then, the lens retainer 60, with the arm 510 being assembled thereto, is adhered and fixed to the holder 50 at the peak position Px where the measured resolution is regarded to be a peak. Then, the arm 510 is detached from the lens retainer 60.

Thus, when the lens retainer 60 is fixed to the holder 50 at the peak position Px, the lens retainer 60 is unlikely to be displaced from the peak position Px because the arm 510 is assembled to the lens retainer 60. Thus, adjustment is reliably made at an optimal focus position that has been obtained by measuring resolution.

In particular, in the process of fixing the lens retainer 60 to the holder 50, the peak position Px is obtained while the arm 510 is moved in the other direction parallel to the optical axis L1 (which corresponds to the first direction). Thus, the arm is moved in the one direction parallel to the optical axis L1 (which corresponds to the second direction, see the arrow F1 of FIG. 18B) over the peak position Px, and then the arm 510 is moved in the other direction toward the peak position Px (which corresponds to the first direction, see the arrow F2 of FIG. 18B) to thereby fix the lens retainer 60 to the holder 50 at the peak position Px.

When changing the movement direction of the arm from the other direction to the one direction (i.e., from the first direction to the second direction), there may be the case where the lens retainer 60 does not move in spite of the X stage 520 being driven to serve as an actuator for moving the arm 510, due to the allowance or the like of the X stage 520. In this case, if adjustment is made by moving the lens retainer 60 in the other direction (i.e., the first direction) toward the peak position Px which has been found during movement in the other direction (i.e., the first direction), the lens retainer 60 may be fixed at a position displaced from the peak position Px.

Therefore, if the peak position Px has been obtained during movement in the other direction (i.e., the first direction), the arm 510 may be moved over the peak position Px in the secondary direction parallel to the optical axis L1. Then, the arm 510 may be moved in the other direction (i.e., the first direction) toward the peak position Px to fix the lens retainer 60 to the holder 50 at the peak position Px. This may prevent the occurrence of displacement, mentioned above, from the peak position Px, and adjustment can be more reliably made at an optimal focus position.

In the process of sequentially measuring resolution (contrast value), the movement amount when a resolution of not less than the predetermined value N1 is measured may be made smaller, as is done for the movement amount X2 or X3, than the movement amount X1 when a resolution of less than the predetermined value N1 is measured. Thus, measurement time up to the vicinity of the peak position Px can be reduced, and measurement accuracy is enhanced in terms of measurement in the vicinity of the peak position Px. Thus, reduction of measurement time and enhancement of measurement accuracy can both be satisfied.

The method of manufacturing a light-receiving optical system using the arm 510 and the like can be applied to other embodiments.

The present invention should not be construed as being limited to the above embodiments and modifications, but may, for example, be embodied as follows.

(1) To reliably perform adjustment for determining an optimal focus position, the lens retainers 160, 260, 360 and 460 of the second to fifth embodiments may each be provided with engagement portions similar to the pair of engagement portions 64 of the lens retainer 60, for use in slide adjustment.

(2) Application of the present invention is not limited to the optical information reader for optically reading an information code. The present invention may be applied to an optical information reader for optically reading character information or the like by using a known symbol recognition processing function (OCR), or may be applied, for example, to an information reader having both a wireless communication medium and a wireless communication function for performing wireless communication.

Seventh Embodiment

Referring to the drawings, an optical information reader according to a seventh embodiment of the present invention will be described.

FIGS. 20 to 23 each show an optical information reader 610 which is constituted as a code reader that optically reads one or more information codes (e.g., one- or two-dimensional codes). The optical information reader 610 has an appearance similar to a gun and is provided with a casing 611 which is made of a synthetic resin, such as an ABS resin, and houses a circuit part 20 including various electrical components and the like.

Figure 20:
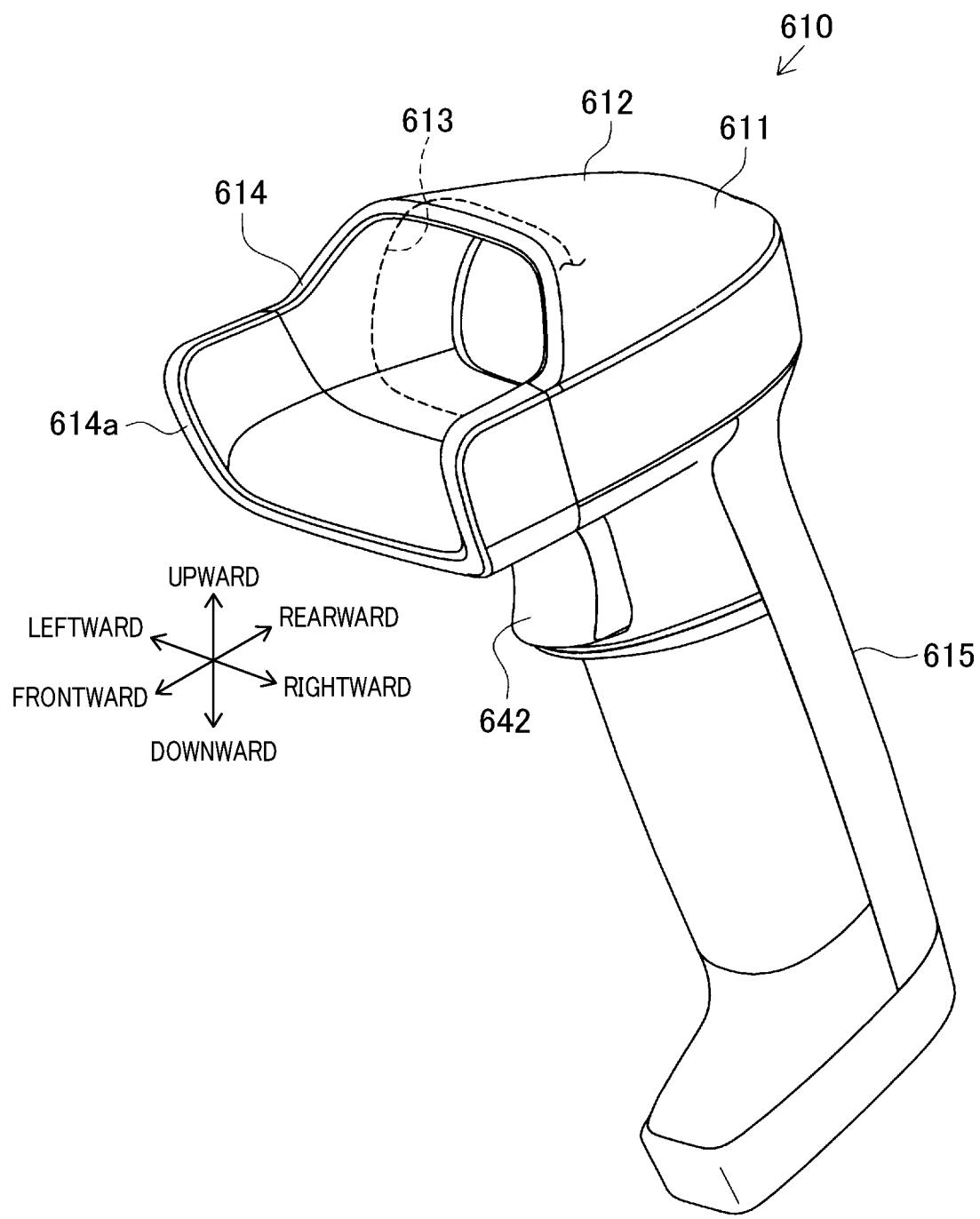
FIG. 20 is a schematic perspective view illustrating an optical information reader according to a seventh embodiment of the present invention.
Figure 21:
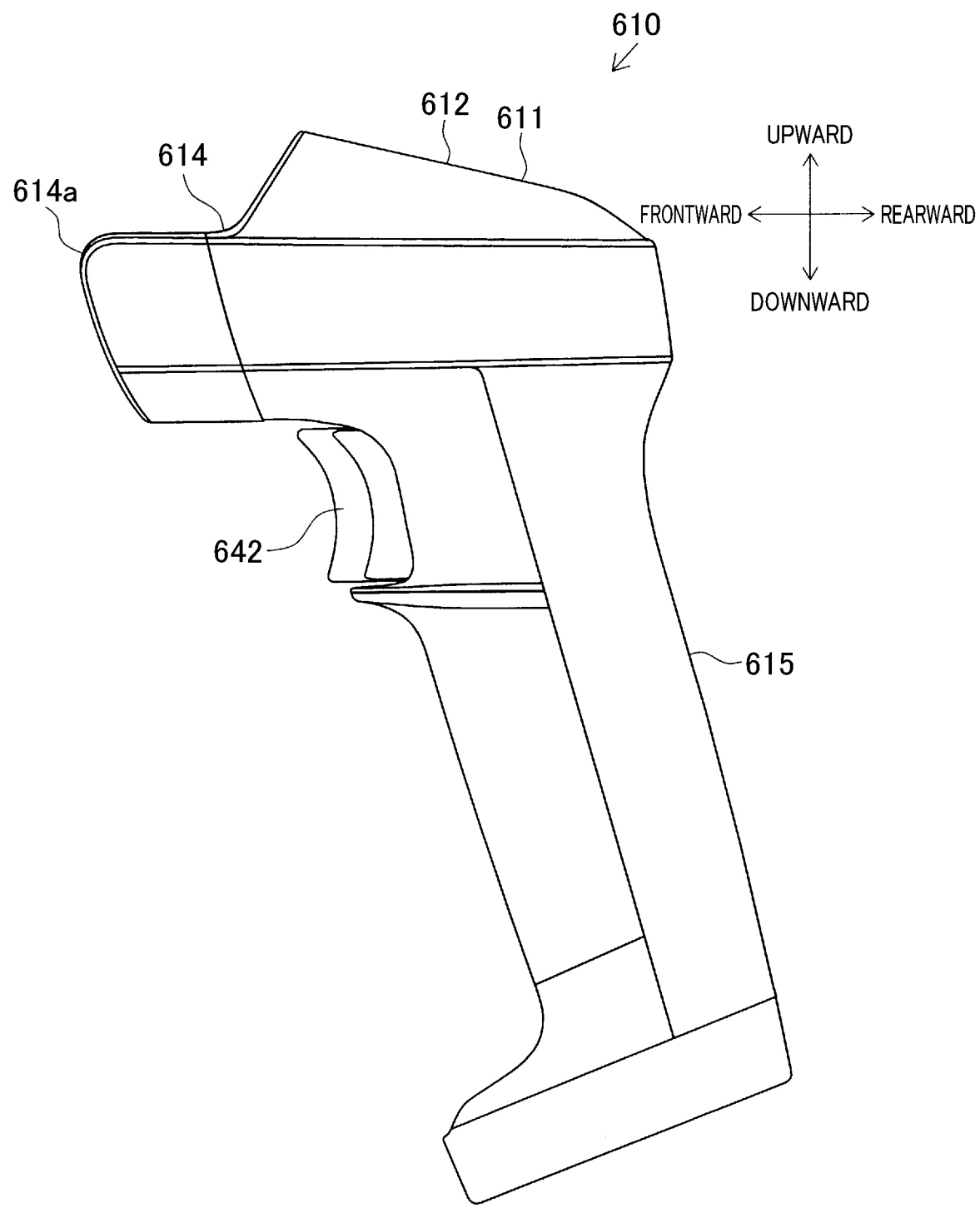
FIG. 21 is a right-side view illustrating the optical information reader of FIG. 20.
Figure 22:
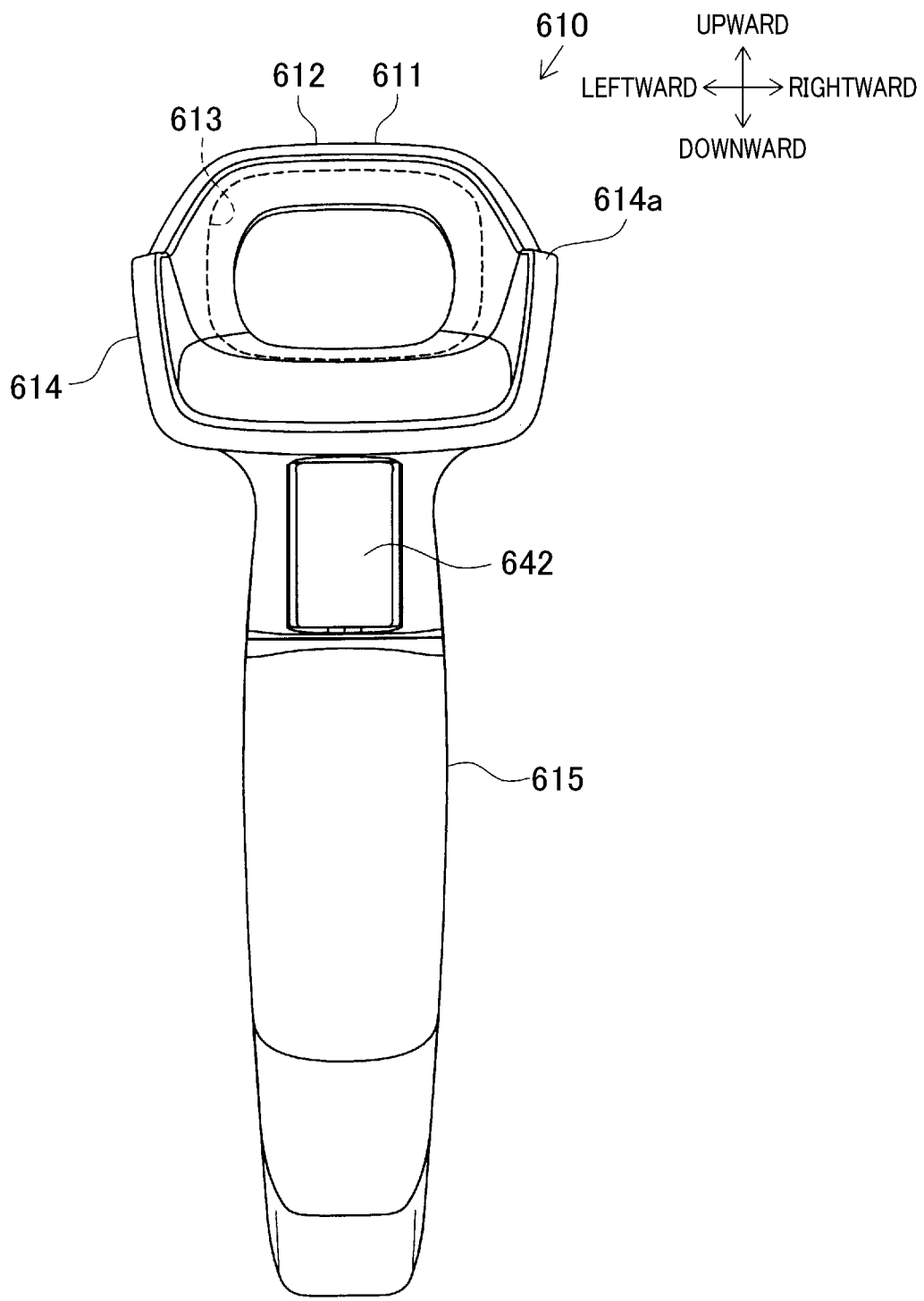
FIG. 22 is a front view illustrating the optical information reader of FIG. 20.

As shown in FIGS. 20 to 22, the optical information reader 610 includes a body 612 and a grip 615. The body 612 has an end portion in which a reading window 613 is formed to pass illumination light and its reflected light therethrough. The grip 615, which is to be held by a user, is connected to a portion of the body 612 different from the portion in which the reading window 613 is formed. As shown in FIG. 22, the reading window 613 is formed so as to have an opening that is in a substantially rectangular shape in which the horizontal length is shorter than the vertical length.

The reading window 613 of the body 612 has a lower portion which is provided with an extension 614. The extension 614 has a substantially U-shaped extension end 614a with an upper portion thereof being open, so that an information code or marker light, described later, can be visually recognized from above even when the extension end 614a is brought into contact with a reading target to which the information code is affixed. The grip 615 extends downward from a bottom wall portion of the body 12. The grip 615 has an upper end near which a trigger switch 642 that can be pressed is arranged, and has a lower end near which a cable (not shown) for an interface is assembled.

Figure 23:
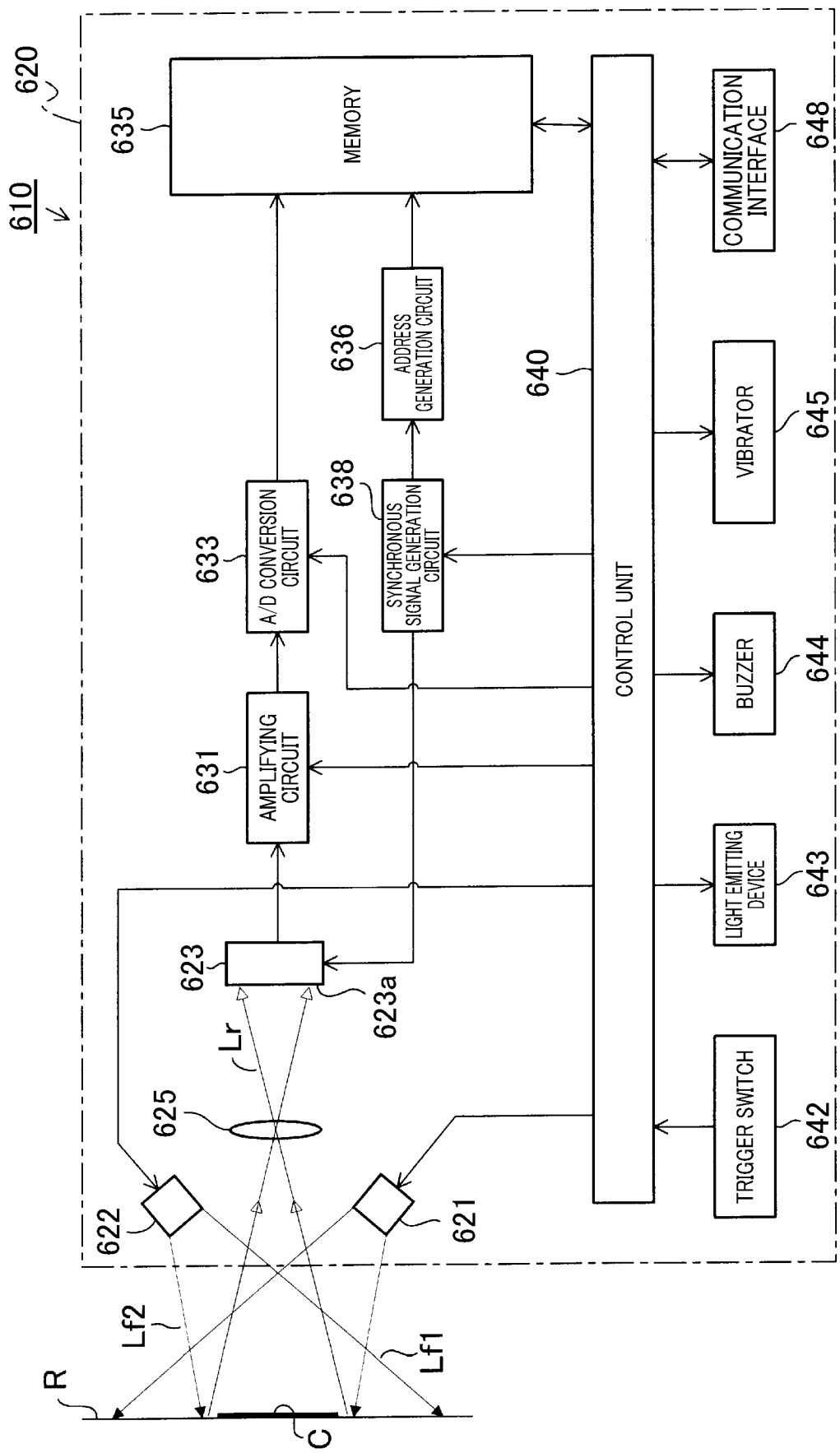
FIG. 23 is a schematic block diagram illustrating an electrical configuration of the optical information reader of FIG. 20.
Figure 24:
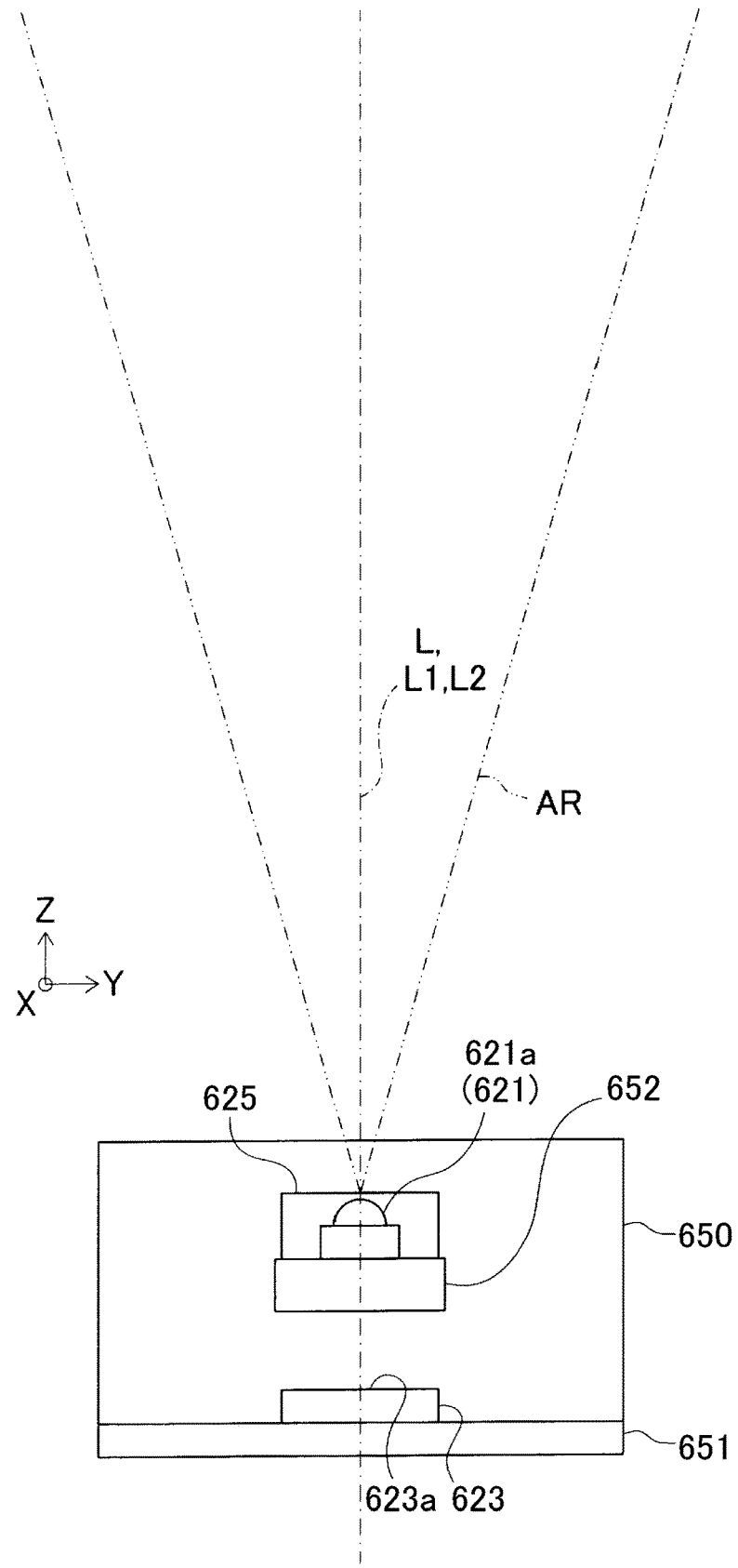
FIG. 24 is a diagram illustrating a positional relationship between a first illuminant and an area sensor, as viewed from a first illuminant side, i.e., in a direction perpendicular to a light-receiving axis, according to the seventh embodiment.

Referring to FIG. 23, an electrical configuration of the optical information reader 10 will be described. This electrical configuration includes components exerting substantially the same functions as those of the components in the electrical configuration shown in FIG. 2 previously referred to. However, for the sake of confirmation, these components will be explained again because different reference signs are designated.

As shown in FIG. 23, the circuit part 620 mainly includes an optical system and a microcomputer system. The optical system includes a first illuminant 621, a second illuminant 622, an area sensor 623 and an imaging lens 625. The microcomputer system includes a memory 635 and a control unit 640.

The optical system includes a projection optical system and a light-receiving optical system. The projection optical system is constituted by a pair of illuminants which are the first and second illuminants 621 and 622. The first illuminant 621 is constituted by a LED 621a emitting visible light Lf1 having a wavelength, e.g., of 380 nm to 750 nm, and an illumination lens provided to an emission side of the LED 621a. The second illuminant 622 is constituted by a LED 622a emitting invisible light Lf2 having a wavelength of 750 nm or more, and an illumination lens provided to an emission side of the LED 622a.

The light-receiving optical system is constituted by the area sensor 623, the imaging lens 25 and other components. The area sensor 623 is constituted as a light-receiving sensor having a rectangular light-receiving surface 623a where light-receiving elements as solid-state imaging elements, such as C-MOSs or CCDs, are two-dimensionally arrayed, so that an image of an information code C can be captured. The area sensor 623 is ensured to output an electrical signal suitable for the intensity of reflected light Lr, for each cell (pattern) of the received information code. The area sensor 623 is mounted to a sensor substrate 651 so that light entering the light-receiving optical system via the imaging lens 625 can be received.

The imaging lens 625 includes one or more lenses and serves as an imaging optical system for collecting light entering through the reading window 613 from outside and producing an image on the light-receiving surface 623a of the area sensor 623. In the present embodiment, the reflected light Lr from the information code C or from a given surface R to be read (hereinafter termed "target surface R") to which the information code C is affixed is collected by the imaging lens 625 to produce a code image on the light-receiving surface 623a of the area sensor 623. The specific arrangement and configuration of the optical system constituted in this way will be described later.

The microcomputer system includes an amplifying circuit 631, an A/D conversion circuit 633, a memory 635, an address generation circuit 636, a synchronous signal generation circuit 638, a control unit 640, a trigger switch 642, a light emitting part 643, a buzzer 644, a vibrator 645 and a communication interface 648.

The area sensor 623 of the optical system outputs an image signal (analog signal) which is inputted to the amplifying circuit 631 for amplification by a predetermined gain. Then, the amplified signal is inputted to the A/D conversion circuit 633 for conversion from the analog signal to a digital signal. Then, the digitized signal, i.e., image data (image information), is inputted to the memory 635 constituted by a known storage medium, such as ROM or RAM, for storage in a predetermined storage area.

The synchronous signal generation circuit 638 is ensured to generate a synchronous signal for the area sensor 623 and the address generation circuit 636. The address generation circuit 636 is ensured to generate a storage address of image data to be stored in the memory 635, based on the synchronous signal supplied from the synchronous signal generation circuit 638.

The control unit 640, which is a microcomputer capable of controlling the entire optical information reader 610, includes a CPU, a system bus and an I/O interface. The control unit 640 constitutes an information reading device together with the memory 635 and has an information processing function. The control unit 640 is ensured to decrypt (decode) an image of an information code captured by the area sensor 623 and stored in the memory 635.

The control unit 640 is connected to various I/O devices via the I/O interface incorporated therein. In the present embodiment, the control unit 640 is connected to the trigger switch 642, the light emitting part 643, the buzzer 644, the vibrator 645, the communication interface 648, and other components. This enables, for example, monitoring or management of the trigger switch 642, turn-on/off of the light emitting part 643, turn on/off of the buzzer 644 that is capable of generating beeps and alarms, drive control of the vibrator 45, or control of the communication interface 648.

Referring to FIGS. 24 to 28, a specific configuration and the like of the optical system provided as above will be described. It should be noted that, in the following description, a short-side direction of the light-receiving surface 623a is assumed to be an X direction, a long-side direction of the light-receiving surface 623a is assumed to be a Y direction, and a direction (light-receiving axis direction) perpendicular to both the X- and Y-directions is assumed to be a Z direction.

In the optical system of the present embodiment, the sensor substrate 651 to which the area sensor 623 is mounted, a first illumination substrate 652 to which the LED 621a is mounted, a second illumination substrate 653 to which the LED 622a is mounted, and the like are fixed to predetermined positions of the holder 650. Thus, the first and second illuminants 621 and 622, the area sensor 623 and the imaging lens 25 are arranged in a positional relationship shown in FIGS. 24 and 25.

Figure 25:
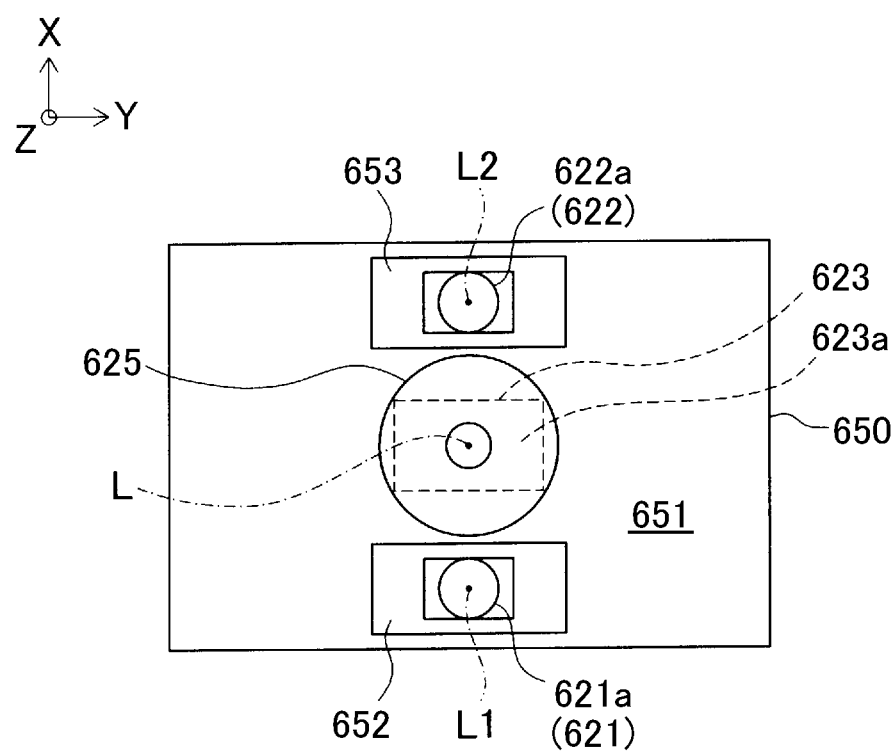
FIG. 25 is a diagram illustrating a positional relationship of two illuminants relative to the area sensor, as viewed from a reading window side according to the seventh embodiment.

Specifically, as shown in FIG. 25, the first and second illuminants 621 and 622 are arranged in line in the short-side direction of the light-receiving surface 623a (X direction). The imaging lens 25 is arranged between the first and second illuminants 621 and 622 so as to be equally distanced from them. Thus, the light-receiving axis L of the area sensor 623 can be located between the first and second illuminants 621 and 622.

Accordingly, the light-receiving axis L, a projection optical axis L1 of the first illuminant 621 and a projection optical axis L2 of the second illuminant 622 align in parallel with one another in the short-side direction of the light-receiving surface 623a. Specifically, the first and second illuminants 621 and 622 are arranged such that the distance from the LED 621a to the light-receiving axis L will be equal to the distance from the LED 622a to the light-receiving axis L.

The holder 650, to which the sensor substrate 651, the first and second illumination substrates 652 and 653, and the like are fixed with the positional relationship as mentioned above, is housed in the casing 611 such that the long-side direction of the light-receiving surface 623a (Y direction) is substantially parallel to the horizontal direction of the reading window 613. The area sensor 623 has a rectangular imaging field of view AR according to the shape of the light-receiving surface 623a. Therefore, in the imaging field of view AR, the vertical direction corresponds to the long-side direction as in the reading window 613, and the irradiation range of the visible light Lf1 and that of the invisible light Lf2 are unlikely to be misaligned in the horizontal direction, with the center positions thereof being substantially aligned with each other, but are misaligned in the vertical direction.

Usually, when reading an information code that is long in a single direction, such as a barcode, the information code is oriented to the reading window 613 such that the long-side direction of the information code will align with the long-side direction of the imaging field of view AR, i.e., the long-side direction of the reading window 613. Therefore, unlike the present embodiment, reading may be unsuccessful if the irradiation ranges are misaligned in the long-side direction of the imaging field of view AR, e.g., if the invisible light Lf2 is applied to one end portion of the barcode in the long-side direction and is not applied to the other end portion thereof in the long-side direction.

In this regard, in the present embodiment, the irradiation range of the visible light Lf1 is not misaligned from the irradiation range of the invisible light Lf2 in the long-side direction of the imaging field of view AR with respect to the information code C. Therefore, unsuccessful reading as mentioned above is minimized, which would occur due to misalignment of the irradiation ranges in the long-side direction of the imaging field of view AR.

In particular, in the present embodiment, the first and second illuminants 621 and 622 are arranged such that the irradiation range of the first illuminant 621 is located at a level lower than that of the second illuminant 622. In other words, the holder 50 is housed in the casing 11 so that the first illuminant 621 is located at a level lower than that of the second illuminant 622.

Referring to FIGS. 26 to 28, the reason for locating the first illuminant 621 at a level lower than that of the second illuminant 622 will be described.

Usually, when reading an information code C presented on a given target surface R, such as a label, the user may perform reading while observing the information code C via the reading window 613. Therefore, the upper part of the given target surface R tends to be relatively tilted and face away from the reading window 613 when reading, for example, an information code C on a given target surface R of a hand-held label or the like as shown in a part (A) of FIG.

26, or an information code C on a given target surface R of a label or the like placed on a desk as shown in the part (A) of FIG. 26.

In this situation, a return field of view AR1 produced via the given target surface R is at a level higher than that of the light-receiving axis L relative to the imaging field of view AR. Accordingly, if the first illuminant 21 emitting the visible light Lf1 having light intensity higher than that of the invisible light Lf2 is located at a level higher than that of the light-receiving axis L as shown in a part (B) of FIG. 27B, the first illuminant 621 may tend to enter the return field of view AR1. In other words, an image of the visible light Lf1 reflected on the given target surface R is likely to be captured. Therefore, as shown in a part (B) of FIG. 28, the captured image of the information code C may include an image of the visible light Lf1, deteriorating reading performance.

To cope with this, the first illuminant 621 may be located at a level lower than that of the light-receiving axis L. Specifically, the first and second illuminants 621 and 622 may be arranged such that the irradiation range of the first illuminant 621 is located at a level lower than that of the second illuminant 622, as viewed from the user (see FIG. 25). Thus, as shown in a part (A) of FIG. 27, the first illuminant 621 is unlikely to enter the return field of view AR1 produced via the given target surface R. Thus, as shown in Fig. a part (A) of 28, an image of the visible light Lf1 may no longer be taken into the captured image of the information code C. This may minimize reading performance deterioration which is due to capturing of an image of the visible light Lf1 having high light intensity.

As described above, the optical information reader 610 of the present embodiment includes the area sensor 623, and first and second illuminants 621 and 622. The area sensor 623 receives reflected light from the information code C at the rectangular light-receiving surface 623a. The first and second illuminants 621 and 622 respectively emit the visible light Lf1 and the invisible light Lf2 as illumination light toward the imaging field of view AR of the area sensor 623. The first and second illuminants 621 and 622 are arranged in line along the short-side direction of the light-receiving surface 623a (X direction).

Thus, the irradiation ranges of the visible light Lf1 and the invisible light Lf2 are unlikely to be misaligned in the long-side direction of the imaging field of view AR, relative to the imaging field of view AR that is in a rectangular shape according to the shape of the light-receiving surface 623a. This can minimize the occurrence of unsuccessful reading which would have occurred due to misalignment of the irradiation ranges in the long-side direction of the imaging field of view AR. Accordingly, if both the first and second illuminants 621 and 622 respectively emitting the visible light Lf1 and the invisible light Lf2 are mounted, reading performance deterioration due to misalignment between the irradiation ranges is minimized.

Furthermore, the first and second illuminants 621 and 622 are arranged such that the light-receiving axis L of the area sensor 623 is located therebetween. Thus, the center of the imaging field of view AR and the centers of the irradiation ranges of the visible light Lf1 and the invisible light Lf2 approach for alignment in the short-side direction of the imaging field of view AR. Therefore, misalignment between the imaging field of view Ar and the irradiation ranges can be reduced even more to thereby improve reading performance.

In particular, the first and second illuminants 621 and 622 are arranged such that the irradiation range of the first illuminant 621 is located at a position lower than that of the second illuminant 622. Thus, as mentioned above, the first illuminant 21 may no longer enter the return field of view AR1 produced via the given target surface R. This may minimize reading performance deterioration which would have occurred due to capturing an image of the visible light Lf1 having high light intensity.

Eighth Embodiment

Figure 29:
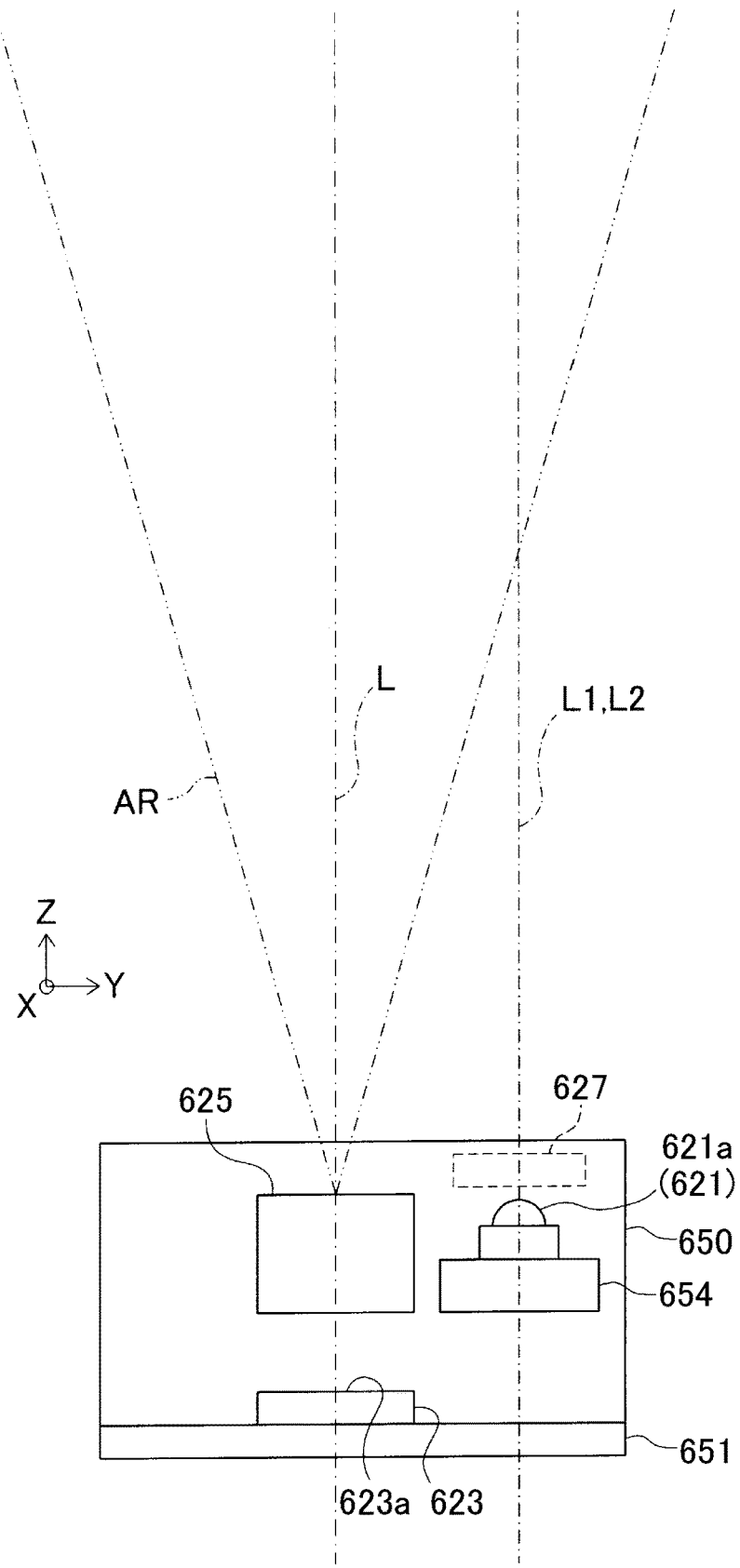
FIG. 29 is a diagram illustrating a positional relationship between a first illuminant and an area sensor, as viewed from a first illuminant side, i.e., in a direction perpendicular to a light-receiving axis, according to an eighth embodiment.
Figure 30:
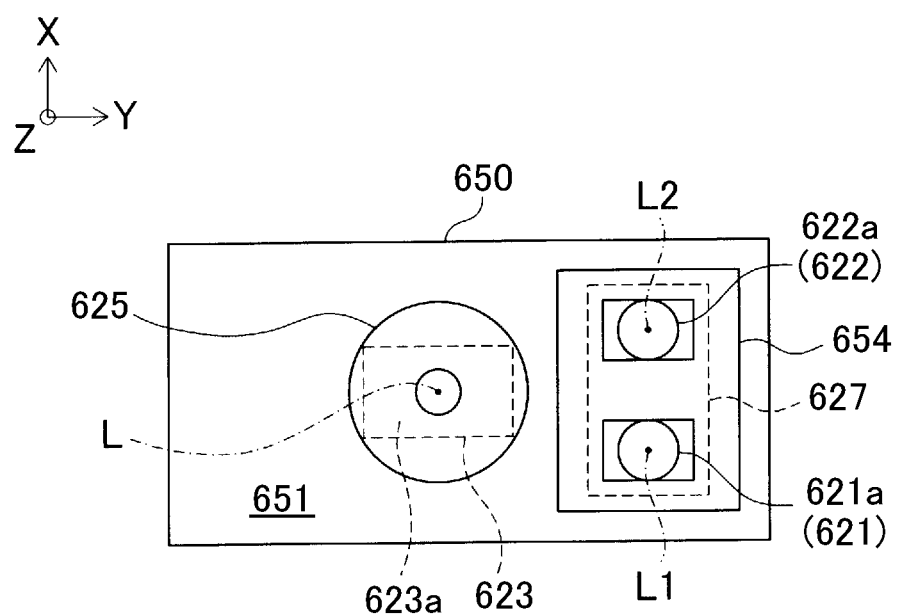
FIG. 30 is a diagram illustrating a positional relationship of two illuminants relative to an area sensor, as viewed from a reading window side according to the eighth embodiment.

Referring to FIGS. 29 and 30, an optical information reader according to an eighth embodiment will be described.

The eighth embodiment is mainly different from the seventh embodiment in that the first and second illuminants 621 and 622 are mounted to the same substrate.

Specifically, as shown in FIGS. 29 and 30, the LEDs 621a and 622a are both mounted on an illumination substrate 654, so that the first and second illuminants 621 and 622 are arranged in line along the short-side direction of the light-receiving surface 623a (X direction). In this case, the first and second illuminants 621 and 622 are arranged close to each other while being distanced from the imaging lens 625 in the long-side direction of the light-receiving surface 623a (Y direction), with the distance from the LED 621a to the light-receiving axis L being made equal to the distance from the LED 622a to the light-receiving axis L.

In particular, in the present embodiment, since the first and second illuminants 621 and 622 are closely arranged, there is provided an illumination lens 627 that is an integration of the illumination lenses of the first and second illuminants 621 and 622. In FIGS. 29 and 30, the position of the illumination lens 627 is schematically indicated by the broken line.

Thus, since the first and second illuminants 621 and 622 are arranged being distanced from the imaging lens 625 in the long-side direction of the light-receiving surface 623a, there may occur no interference with the imaging lens 625, if the first and second illuminants 621 and 622 are arranged closer to each other in the short-side direction of the light-receiving surface 623a than in the seventh embodiment. Thus, closer arrangement of first and second illuminants 621 and 622 can save space in the holder 650, which may lead to downsizing of the optical information reader 610.

Furthermore, the first and second illuminants 621 and 622 being mounted to the same illumination substrate 654 can not only minimize misalignment between these illuminants, but also facilitate compact arrangement of these illuminants. Consequently, the optical information reader 610 can be downsized.

In particular, integration of the illumination lenses of the first and second illuminants 621 and 622 into the illumination lens 627 can not only reduce the number of parts of the illumination lens, but also facilitate compact arrangement of these illuminants. Consequently, the optical information reader 610 can be downsized.

It should be noted that the configuration of mounting the first and second illuminants 621 and 622 on the same substrate, or the configuration of integrally forming the illumination lenses of the first and second illuminants 621 and 622, or other configurations may be applied to other embodiments or the like.

The present invention should not be construed as being limited to the embodiments and modifications described above, but may, for example, be embodied as follows.

(1) The present invention is not limited to have an arrangement, as shown in FIG. 25 or 30, in which the first illuminant 621 is positioned at a level lower than that of the second illuminant 622. For example, in a reading work environment or the like where the return field of view AR1 produced via the given target surface R tends to be located at a level lower than that of the light-receiving axis L, the first illuminant 621 may be positioned at a level higher than that of the second illuminant 622.

(2) The present invention is not limited to have an arrangement in which the distance from the LED 621a to the light-receiving axis L is equal to the distance from the LED 622a to the light-receiving axis L as described above, when arranging the first and second illuminants 621 and 622 in line along the short-side direction of the light-receiving surface 623a (X direction). The distance from the LED 621a to the light-receiving axis L may be larger than the distance from the led 622a to the light-receiving axis L, or vice versa.

(3) Application of the present invention is not limited to the application to an optical information reader having an appearance similar to a gun. The present invention may be applied to optical information readers having various appearances. For example, the present invention may be applied to an optical information reader having a substantially box-shaped appearance. Furthermore, application of the present invention is not limited to the application to an optical information reader that optically reads an information code. The present invention may be applied to an optical information reader that optically reads character information or the like by using a known symbol recognition processing function (OCR), or may be applied to an information reading device having other functions, e.g., a wireless communication function of wirelessly communicating with a wireless communication medium, in addition to the function of optically reading an information code or the like.

DESCRIPTION OF PARTIAL REFERENCE SIGNS

10 . . . Optical information reader
23 . . . Area sensor
23a . . . Light-receiving surface
25 . . . Imaging lens
50, 150, 250, 350, 450 . . . Holder
53 . . . Edge portion
54 . . . Top surface (guide surface, first guide surface)
55 . . . Opening
56a, 56b . . . Edge face (guide surface, second guide surface)
60, 160, 260, 360, 460 . . . Lens retainer
61 . . . Retainer body
61a, 61b . . . End face (reference surface, second reference surface)
62 . . . Flange
63 . . . Flange bottom surface (reference surface, first reference surface)
500 . . . Manufacturing device
510 . . . Arm
520 . . . X stage
530 . . . Control unit
L, L1, L2 . . . Optical axis
S . . . One-sided blur portion
610 . . . Optical information reader
621 . . . First illuminant
622 . . . Second illuminant
623 . . . Area sensor
625 . . . Imaging lens
AR . . . Imaging field of view
AR . . . Return field of view
C . . . Information code
Lf1 . . . Visible light
Lf2 . . . Invisible light
R . . . Given target surface

The invention claimed is:

1. An optical information reader comprising:
an area sensor that (i) has a rectangular light-receiving surface having a long side and (ii) receives reflected light from an information code via an imaging lens, the information code being optically read based on a signal outputted from the area sensor;
a holder to which the area sensor is fixed; and
a lens retainer that retains the imaging lens and is assembled, in this state, into the holder, the lens retainer including a reference surface that is parallel to an optical axis of the imaging lens, wherein:
the holder is provided with a guide surface with which the reference surface is brought into surface contact and against which the reference surface is brought into slidable contact, the surface contact being achieved when the lens retainer is assembled into the holder so that light passing through the imaging lens produces an image on the area sensor, the slidable contact being achieved when the lens retainer is moved along the optical axis;
a position of the imaging lens has been confirmed, one-sided blur occurring at the position of the imaging lens, the one-sided blur causing deterioration in performance in terms of a produced image in a portion of a field of view via the imaging lens; and
the lens retainer retains the imaging lens such that the portion of the field of view causing the one-sided blur is located outside the light-receiving surface on the long side of the light-receiving surface.

2. The optical information reader according to claim 1, wherein
the reference surface includes a planar first reference surface and planar second reference surfaces with which the first reference surface intersects; and
the guide surface includes a planar first guide surface with which the first reference surface is brought into slidable contact, and planar second guide surfaces with which the second reference surfaces are respectively brought into slidable contact.

3. The optical information reader according to claim 2, wherein
the lens retainer includes a flange;
the flange has a flat surface on an imaging lens side, the flat surface including at least a portion serving as the first reference surface; and
the holder is formed so that a portion of the lens retainer is housed in the holder via an opening provided to a flat surface of the holder, the portion of the lens being located closer to the imaging lens than to the flange when assembled, the flat surface having at least a portion serving as the first guide surface.

4. The optical information reader according to claim 3, wherein the flange is formed so as to have a flat surface on an imaging lens side, the flat surface covering the opening during the slidable contact.

5. The optical information reader according to claim 2, wherein
the first reference surface and the second reference surfaces are formed using a projection provided to an outer surface of the lens retainer; and
the first guide surface and the second guide surfaces are formed using a recess provided to the holder.

6. The optical information reader according to claim 2, wherein
the first reference surface and the second reference surfaces are formed using a recess provided to an outer surface of the lens retainer; and
the first guide surface and the second guide surfaces are formed using a projection provided to the holder.

7. The optical information reader according to claim 2, wherein the lens retainer is formed so that at least a portion of an outer peripheral surface of the lens retainer serves as the first reference surface and the second reference surfaces, the outer peripheral surface having a polygonal cross section as viewed perpendicularly to a plane through which the optical axis passes.

8. The optical information reader according to claim 1, wherein the lens retainer is formed so that at least a portion of an outer peripheral surface of the lens retainer serves as the reference surface.

9. The optical information reader according to claim 1, wherein the lens retainer is provided with engagement portions used when the lens retainer is moved relative to the holder along the optical axis.

10. A method of manufacturing an optical information reader,
the optical information reader comprising:
an area sensor that receives reflected light from an information code via an imaging lens, the information code being optically read based on a signal outputted from the area sensor;
a holder to which the area sensor is fixed; and
a lens retainer that retains the imaging lens and is assembled, in this state, into the holder, the lens retainer including a reference surface that is parallel to an optical axis of the imaging lens, wherein
the holder is provided with a guide surface with which the reference surface is brought into surface contact and against which the reference surface is brought into slidable contact, the surface contact being achieved when the lens retainer is assembled into the holder so that light passing through the imaging lens produces an image on the area sensor, the slidable contact being achieved when the lens retainer is moved along the optical axis, and
the method comprising steps of:
assembling the lens retainer retaining the imaging lens into the holder, to which the area sensor is fixed, whereby the reference surface is brought into surface contact with the guide surface;
assembling an arm movable along the optical axis to the lens retainer;
sequentially measuring resolution of the area sensor, while the arm is moved in a direction along the optical axis so that the reference surfaces is brought into slidable contact with the guide surface;
fixing the lens retainer, with the arm being assembled thereto, to the holder at a peak position where measured resolution is regarded to be a peak; and
detaching the arm from the lens retainer.

11. The method of manufacturing an optical information reader according to claim 10, wherein, in the step of fixing the lens retainer to the holder, the peak position is obtained while the arm is moved in a primary direction along the optical axis, the arm is then moved over the peak position in a secondary direction, which is opposite to the primary direction, along the optical axis, and the arm is then moved again in the primary direction toward the peak position to fix the lens retainer to the holder at the peak position.

12. The optical information reader according to claim 10, wherein, in the step of sequentially measuring resolution, a movement amount of the arm when resolution of a predetermined value or more is measured is set so as to be smaller than a movement amount of the arm when resolution of less than the predetermined value is measured.

13. An optical information reader comprising:
an area sensor that (i) has a rectangular light-receiving surface having mutually orthogonal long and short sides, (ii) has a light-receiving axis, and (iii) receives reflected light from an information code at the rectangular light-receiving surface, the information code being optically read based on a signal outputted from the area sensor;
an imaging lens located in a path of the reflected light reflected by the imaging code and configured to image the reflected light on the area sensor;
a first illuminant emitting visible light and a second illuminant emitting invisible light toward an imaging field of view of the area sensor, the visible light and the invisible light serving as illumination light, wherein
the first illuminant and the second illuminant are arranged in line via the imaging lens located between the first and second illuminant in a direction along the short side of the light-receiving surface when viewed along the light-receiving axis.

14. The optical information reader according to claim 13, wherein the first illuminant and the second illuminant are arranged such that (i) the light-receiving axis of the area sensor is located between the first illuminant and the second illuminant when viewed along the light-receiving axis and (ii) a distance between the first illuminant and the imaging lens and a distance between the imaging lens and the second illuminant are equal to each other in the direction along the short side.

15. The optical information reader according to claim 13, wherein
the first illuminant and the second illuminant are arranged being-so as to be distanced from the imaging lens in a direction along the long side long side direction of the light-receiving surface.

16. The optical information reader according to claim 13, wherein the first illuminant and the second illuminant are mounted on the same substrate.

17. The optical information reader according to claim 13, wherein an illumination lens used for the first illuminant and an illumination lens used for the second illuminant are integrally formed.

18. The optical information reader according to claim 13, wherein the first illuminant and the second illuminant are arranged so that an irradiation range of the first illuminant is positioned at a level lower than that of an irradiation range of the second illuminant as viewed from a user.

* * * * *